United States Patent
Ashraf et al.

(10) Patent No.: US 11,707,995 B2
(45) Date of Patent: Jul. 25, 2023

(54) BATTERY PACK FOR BATTERY ELECTRIC VEHICLE

(71) Applicant: Nikola Corporation, Phoenix, AZ (US)

(72) Inventors: Umran Ashraf, Phoenix, AZ (US); Michael Corona, Phoenix, AZ (US); T. Neil McLemore, Phoenix, AZ (US); Varoujan Sarkissian, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 57 days.

(21) Appl. No.: 17/536,687

(22) Filed: Nov. 29, 2021

(65) Prior Publication Data

US 2022/0169127 A1    Jun. 2, 2022

Related U.S. Application Data

(63) Continuation of application No. 17/403,179, filed on Aug. 16, 2021, now Pat. No. 11,279,243.

(60) Provisional application No. 63/119,401, filed on Nov. 30, 2020.

(51) Int. Cl.
*B60L 50/60* (2019.01)
*H02J 7/00* (2006.01)
*B60L 50/64* (2019.01)

(52) U.S. Cl.
CPC .............. *B60L 50/66* (2019.02); *B60L 50/64* (2019.02); *H02J 7/0016* (2013.01); *H02J 7/0029* (2013.01); *H02J 7/0048* (2020.01)

(58) Field of Classification Search
CPC ........ B60L 50/66; B60L 50/64; H02J 7/0048; H02J 7/0016; H02J 7/0029
See application file for complete search history.

(56) References Cited

U.S. PATENT DOCUMENTS

| | | |
|---|---|---|
| 5,585,205 A | 12/1996 | Kochi |
| 6,085,854 A | 7/2000 | Nishikawa |
| 6,402,229 B1 | 6/2002 | Suganuma |
| 6,843,524 B2 | 1/2005 | Kitagawa |
| 7,393,016 B2 | 7/2008 | Mitsui et al. |
| 7,883,113 B2 | 2/2011 | Yatsuda |
| 8,212,412 B1 | 7/2012 | Benedict |
| 8,540,259 B1 | 9/2013 | Young et al. |
| 9,937,801 B2 | 4/2018 | Kusumi et al. |

(Continued)

FOREIGN PATENT DOCUMENTS

| | | |
|---|---|---|
| CN | 204249928 | 4/2015 |
| CN | 105438262 | 3/2016 |

(Continued)

OTHER PUBLICATIONS

USPTO, Notice of Allowance in U.S. Appl. No. 17/403,179 dated Jan. 25, 2022.

(Continued)

*Primary Examiner* — Jared Fureman
*Assistant Examiner* — Duc M Pham
(74) *Attorney, Agent, or Firm* — Snell & Wilmer L.L.P.

(57) ABSTRACT

Connection and control concepts for battery packs in a high voltage battery assembly are provided. Parallel, modular configurations permit improved safety, voltage balancing, and redundancy, improving operation and reliability of an associated high voltage electrical vehicle such as a heavy-duty truck.

19 Claims, 13 Drawing Sheets

(56) References Cited

U.S. PATENT DOCUMENTS

| | | |
|---|---|---|
| 10,493,837 B1 | 12/2019 | Angelo et al. |
| 2011/0049977 A1 | 3/2011 | Onnerud et al. |
| 2012/0244398 A1 | 9/2012 | Youngs et al. |
| 2012/0313439 A1* | 12/2012 | Yamaguchi ............ H02J 7/0016 307/71 |
| 2013/0113290 A1 | 5/2013 | Sato |
| 2013/0270028 A1 | 10/2013 | Young et al. |
| 2014/0232184 A1 | 8/2014 | Ukai |
| 2015/0243956 A1 | 8/2015 | Loo et al. |
| 2018/0069425 A1 | 3/2018 | Mastrandrea |
| 2019/0123542 A1* | 4/2019 | Kambham ............ G01R 31/007 |
| 2019/0255928 A1 | 8/2019 | Erlacher |
| 2020/0238808 A1 | 7/2020 | Hung et al. |
| 2020/0239076 A1 | 7/2020 | Milton et al. |
| 2021/0151726 A1* | 5/2021 | Hinterberger ............ H02J 1/082 |
| 2022/0407307 A1* | 12/2022 | Putnam .................... H02H 7/18 |

FOREIGN PATENT DOCUMENTS

| | | |
|---|---|---|
| DE | 102017007490 | 2/2019 |
| FR | 2985690 | 7/2013 |
| JP | 2016081725 | 5/2016 |

OTHER PUBLICATIONS

USPTO, Non-Final Office Action in U.S. Appl. No. 17/403,179 dated Dec. 21, 2021.
USPTO; International Search Report and Written Opinion in the PCT Application No. PCT/US2021/046172 dated Jan. 20, 2022.
Supplementary European Search Report dated Oct. 10, 2022 in Application No. 21859378.8.
International Search report and written Opinion dated Sep. 9, 2021 in PCT/US2021/032687.
Notice of Allowance dated Aug. 4, 2021 in U.S. Appl. No. 17/321,724.

* cited by examiner

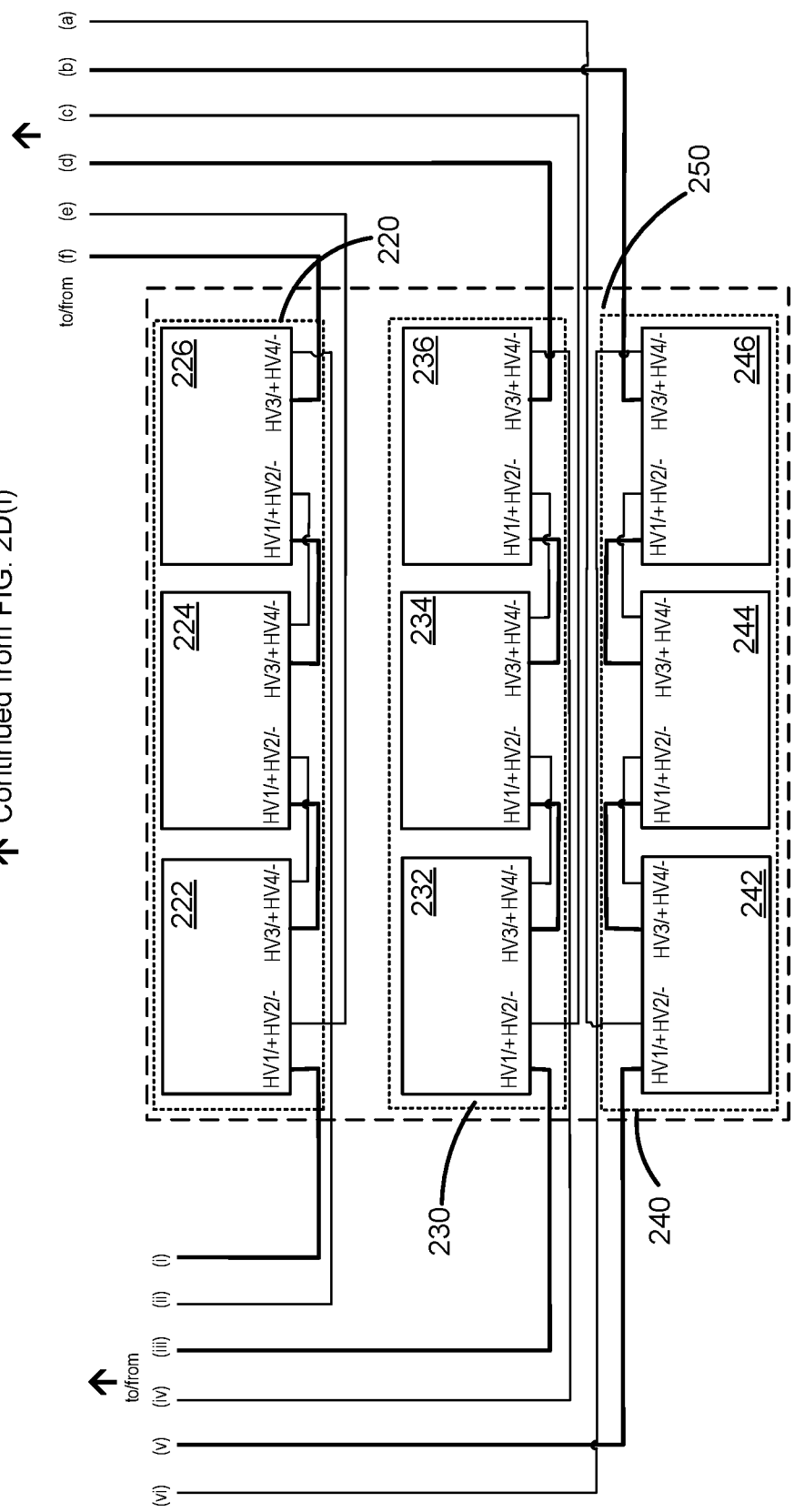
FIG. 2D(ii)

BATTERY PACK FOR BATTERY ELECTRIC VEHICLE

CROSS-REFERENCE TO RELATED APPLICATIONS

This application is a continuation of U.S. Ser. No. 17/403,179 filed on Aug. 16, 2021 and entitled "High Voltage Electrical System for Battery Electric Vehicle." U.S. Ser. No. 17/403,179 claims priority to, and the benefit of, U.S. Provisional Patent Application No. 63/119,401 filed on Nov. 30, 2020 and entitled "High Voltage Electrical System for Battery Electric Vehicle." The disclosure of the foregoing applications is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to electrical control and architecture for battery electric vehicles.

BACKGROUND

Battery electric vehicles (BEVs) utilize one or more onboard batteries that generate an electric current configured to power one or more electric motors that are further configured to operate the vehicle. Conventional systems utilize individual batteries, known as battery cells, that are grouped together as modules, and these modules are further grouped together as battery packs. Conventional systems typically use a single battery pack for all electric vehicles, without the ability to customize at the battery pack level consistent with the operational needs of the vehicle. Accordingly, there is a need for customizable battery assemblies for electric vehicles.

SUMMARY

In an exemplary embodiment, a battery pack comprises (i) a first module assembly comprising a first plurality of battery modules connected in series, and (ii) a second module assembly comprising a second plurality of battery modules connected in series. The first module assembly is electrically coupled to the second module assembly. The battery pack further comprises a circuit breaking system electrically coupled to at least one of the first module assembly and the second module assembly such that, responsive to an emergency signal, the circuit breaking system disables an electrical coupling between the battery pack and one or more components of a battery assembly comprising the battery pack.

In another exemplary embodiment, a method of isolating a battery pack from one or more components of a battery assembly comprises receiving, via a battery management system (BMS), a signal indicating that an emergency situation has been detected. The battery assembly comprises the battery pack, the battery pack comprises a first module assembly and a second module assembly, the first module assembly comprises a plurality of battery modules, and the second module assembly comprises a plurality of battery modules. The method further comprises opening, responsive to the signal, a circuit between a first module assembly and a second module assembly to stop current flow between the first module assembly and the second module assembly.

In another exemplary embodiment, a battery pack comprises a first module assembly comprising a first battery module, a second battery module, a third battery module, and a fourth battery module. The first battery module is electrically coupled in series to the second battery module, the second battery module is electrically coupled in series to the third battery module, and the third battery module is electrically coupled in series to the fourth battery module. The battery pack further comprises a second module assembly comprising a fifth battery module, a sixth battery module, a seventh battery module, and an eighth battery module. The fifth battery module is electrically coupled in series to the sixth battery module, the sixth battery module is electrically coupled in series to the seventh battery module, and the seventh battery module is electrically coupled in series to the eighth battery module. The battery pack further comprises a manual service disconnect (MSD) switch having a first MSD connector and a second MSD connector. The MSD switch is electrically coupled to the fourth battery module at the first MSD connector. The battery pack further comprises a pyro fuse comprising a first fuse connector and second fuse connector. The pyro fuse, at the first fuse connector, is electrically coupled to the MSD switch at the second MSD connector, and the pyro fuse is coupled to the sixth battery module at the second fuse connector. The battery pack further comprises a first positive electrical connector coupled to the first battery module, a second positive electrical connector coupled to the first positive electrical connector, a first negative electrical connector coupled to the eighth battery module, and a second negative electrical connector coupled to the first negative electrical connector.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
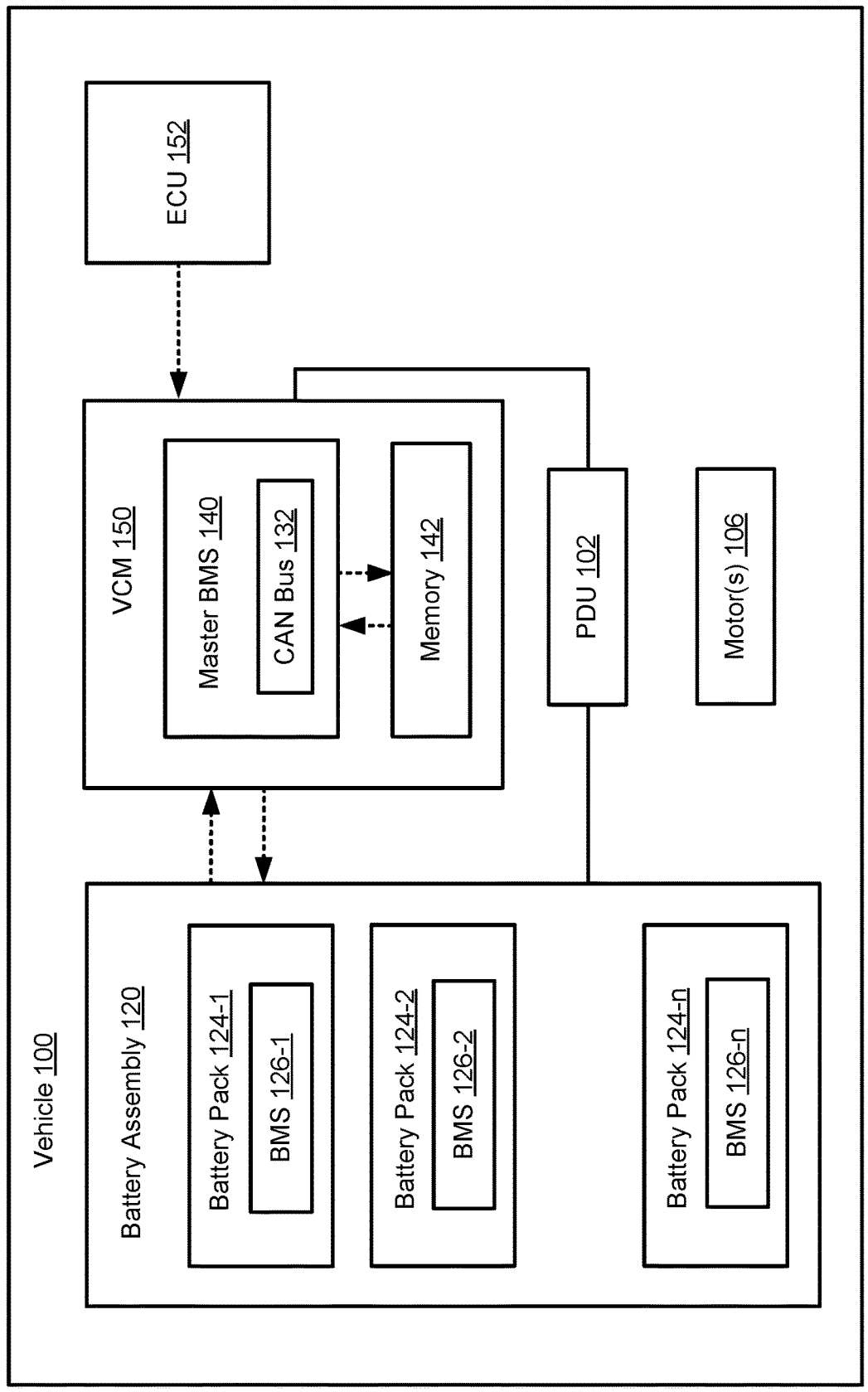
FIG. 1 illustrates a block diagram of an example battery electric vehicle including a battery assembly, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, or mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery, fuel cell, and/or electrical, thermal, or other control or management system of the same. As such, numerous applications of the present disclosure may be realized.

Conventional medium- and heavy-duty commercial vehicles are large contributors to greenhouse gas emissions both domestically and internationally. Carbon pollution resulting from medium- and heavy-duty commercial vehicles can be significantly reduced through electrification of these vehicles. However, electrification of such medium- and heavy-duty vehicles may require a significant increase in power output for operation in comparison to conventional electric vehicles. For example, conventional electric vehicles may be able to operate with a net battery capacity of between about 50 kilowatt-hours (kWh) and about 100 kWh. However, the net battery capacity and operating voltage requirements for a medium- or heavy-duty commercial vehicle may be much higher, for example given the size of the vehicle as well as the operating range desired for the vehicle.

Indeed, it may be advantageous to tailor battery system specifications based at least in part on operating conditions of the vehicle. For example, a heavy-duty vehicle covering a shorter route may utilize a battery assembly having only slightly more battery capacity compared to conventional systems. However, a heavy-duty vehicle covering a longer route may utilize a higher battery capacity to operate over a longer range. Thus, customization of battery mass as well as capacity may be useful to reduce or increase power and/or range depending on operational needs of the vehicle.

Finally, collisions involving high voltage electrical systems in electric vehicles may result in unintended electrical discharge and/or battery leakage or fires that can pose a risk for passengers using or operating the vehicle, or for people or property that may be in the vicinity of the vehicle. Accordingly, it can be desirable to disconnect or isolate a battery, battery module, battery pack, or even battery assembly that may be affected by such emergency situations, for example by detecting impacts or impending impacts to prevent additional damage to the affected battery pack(s) and mitigate the risk that may arise due to further damage to the overall battery system or other components of an associated vehicle.

In order to achieve these and/or other objectives, and to provide for improved safety, modularity, control, and/or management of battery components of an electric vehicle, principles of the present disclosure contemplate use of exemplary systems and methods as disclosed herein.

With reference now to FIG. 1, illustrated is a block diagram of a vehicle 100 incorporating a battery system, in accordance with various embodiments. Vehicle 100 is a battery electric vehicle incorporating an electric powertrain. More specifically, vehicle 100 is an electric commercial vehicle, such as, for example, a class 7 or a class 8 heavy-duty commercial vehicle. While described herein as a battery electric vehicle, vehicle 100 is not limited in this regard and may comprise any suitable type, size, or function of vehicle. For example, vehicle 100 may comprise a fuel cell electric vehicle, CNG vehicle, hythane vehicle, or any other suitable vehicle. Moreover, vehicle 100 may comprise a commercial vehicle of a different weight class (including light and/or medium duty commercial vehicles) or a passenger vehicle in various embodiments. It should be appreciated that vehicle 100 may comprise any vehicle type in need of a battery system as discussed in further detail below.

Vehicle 100 comprises a vehicle control module (VCM) 150, which is responsible for management and control of various vehicle components of vehicle 100. More specifically, VCM 150 is responsible for communication with one or more control units of vehicle 100, and may receive and transmit signals to and from various electronic control units and/or other components of vehicle 100.

VCM 150 further includes a master battery management system (BMS) 140. Master BMS 140 is responsible for control and management of battery assembly 120, and for communication with one or more other control units of vehicle 100. For example, master BMS 140 may transmit to or receive signals from (i) one or more electronic control units (ECU) 152 associated with other components of vehicle 100, and/or (ii) a power distribution unit (PDU) 102 responsible for control of power distribution to various components of vehicle 100, for example one or more motors 106. In exemplary embodiments, VCM 150 comprises and/or contains at least one ECU 152; however, VCM 150 and ECU 152 may also be discrete components in communicative connection with one another.

Master BMS 140 may be coupled to battery assembly 120. Battery assembly 120 may be configured to store power and provide it to operate various components of vehicle 100, for example to power one or more electric motors 106 of vehicle 100. Battery assembly 120 includes one or more battery packs 124 (124-1, 124-2, ..., 124-n). Each battery pack 124 further includes a battery management system (BMS) 126 associated therewith. For example, BMS 126-1 is a control unit responsible for management of battery pack 124-1, BMS 126-2 is a control unit responsible for management of battery pack 124-2, and so on. Accordingly, any discrepancy, fault, failure, event, or change in battery pack 124-1 may be communicated to BMS 126-1 through wired and/or wireless signals from various components of battery pack 124-1, for example current sensors, voltage sensors, temperature sensors, accelerometers, pressure sensors, chemical sensors, and/or the like. BMS 126-1 may then communicate this information to master BMS 140, and master BMS 140 may further transmit appropriate information, control signals, instructions, and/or the like to other battery packs 124 and/or other vehicle 100 components.

In various embodiments, operating information associated with battery assembly 120 or component batteries, modules, or packs thereof, including any change, fault, failure, event, and/or discrepancy in the operation of battery assembly 120 is communicated to master BMS 140. Various signals indicating change and/or discrepancy in the operation of battery assembly 120 may be communicated to master BMS 140 using wired or wireless communication. In exemplary embodiments, VCM 150 is further coupled to memory 142 that may be in direct communication with and/or otherwise accessible to master BMS 140. Memory 142 may store any information received by master BMS 140 from the battery assembly 120, or information received from other control units of vehicle 100. Thus, master BMS 140 has access to information stored in memory 142 on an on-demand basis, as desired. Memory 142 may desirably be fault-tolerant, configured with error-correcting components, and/or otherwise configured to secure and maintain the integrity and reliability of information stored therein. In exemplary embodiments, memory 142 is comprised within VCM 150.

In various embodiments, ECU 152 comprises a crash sensor electronic control unit responsible for management of crash sensor(s) of vehicle 100. Accordingly, when ECU 152 receives a signal from one or more crash sensors indicating an impact or impending impact to vehicle 100, ECU 152 may transmit a signal to VCM 150 to shut off operation of (or otherwise isolate, disconnect, or seek to contain or protect) one or more battery packs 124 in battery assembly 120. This information may be stored in memory 142 and may be accessed or utilized by master BMS 140 thereafter. Similarly, when a battery pack 124 is (or becomes, or is deemed likely to become) non-operational or otherwise damaged, defective, or in a non-nominal operating condition, a signal may be transmitted from BMS 126 of that battery pack 124 to master BMS 140, and this information may be stored in memory 142. Further, this information may be communicated to other control units of vehicle 100 accessible to VCM 150 or power distribution unit 102. In exemplary embodiments, master BMS 140 may include, be configured with, or be coupled to a CAN bus 132. CAN bus 132 may facilitate communication by BMS 140 with various other components of vehicle 100.

With reference now to FIGS. 2A-2D, block diagrams of exemplary high voltage (HV) electrical system 200 within a vehicle such as vehicle 100, are illustrated in accordance with various embodiments. HV electrical system 200 includes a front distribution box 202, a rear distribution box 204 and a battery assembly 250.

Conventional systems include a single distribution box, usually at a front side of the vehicle. In such a conventional system, all of the relevant components of the vehicle (for example, inverters, charge port, battery assembly, and the like) are connected to that single distribution box. Accordingly, such a conventional system requires long and heavy cables that extend from the front distribution box to the inverters located on a rear side of the vehicle. Exemplary embodiments provided herein substantially reduce the length and size of the cables required in a battery system for an electric vehicle (thus reducing component expense, materials requirements, cable resistance losses, and so forth).

Figure 2A:
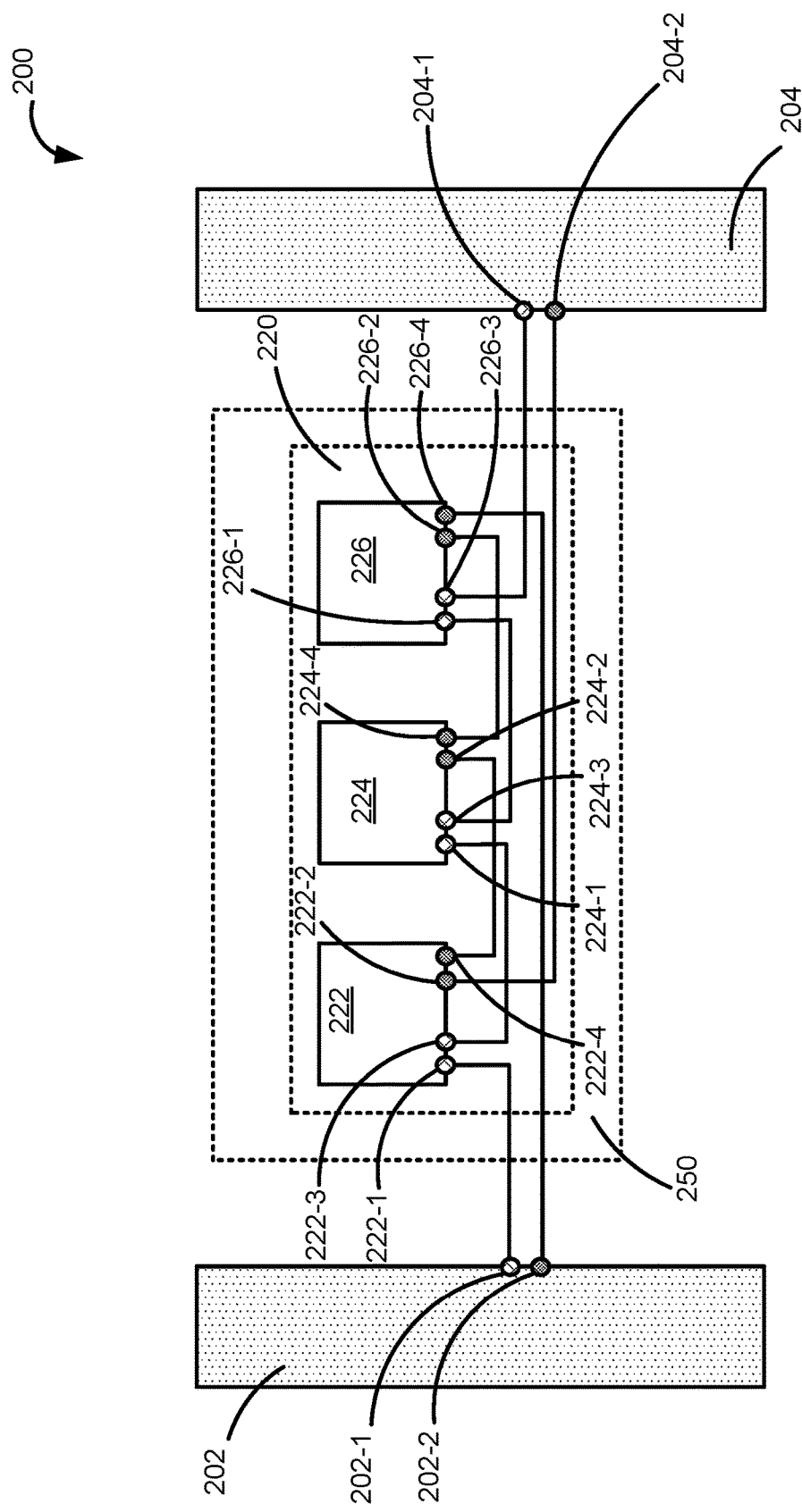
FIG. 2A illustrates a block diagram of an example high voltage electric system including a battery assembly with a 3-pack configuration, in accordance with various embodiments.

For example, in the example shown in FIG. 2A, front distribution box 202 is electrically coupled in parallel with battery assembly 220 and rear distribution box 204. Front distribution box 202 and rear distribution box 204 are coupled to one another through battery assembly 250. In exemplary embodiments, front distribution box 202 is positioned in or on a generally front or forward side, portion, or segment of vehicle 100 and rear distribution box 204 is positioned in or on a generally rear or aft side, portion, or segment of vehicle 100. Accordingly, use of HV electrical system 200 including two distribution boxes 202 and 204 allows localization of both distribution boxes. That is, by coupling front distribution box 202 and rear distribution 204 through battery assembly 250, both distribution boxes 202 and 204 can be configured to operate independently of one another.

For example, front distribution box 202 includes at least one front positive connector 202-1 and at least one front negative connector 202-2. Similarly, rear distribution box 204 includes at least one rear positive connector 204-1 and at least one rear negative connector 204-2. Positive connector 202-1 may be electrically coupled to battery assembly 250 at a first positive connector of battery assembly 250, such as connector 222-1. A second positive connector, such as connector 226-3, may also be electrically coupled to rear distribution box 204 at positive connector 204-1. Further, rear distribution box 204 at negative connector 204-2 may be electrically coupled to battery assembly 250 at a first negative connector such as 222-2. Battery assembly 250 at a second negative connector, such as connector 226-4 may further be electrically coupled to front distribution box 202, for example at negative connector 202-2. Accordingly, such a configuration allows a complete circuit to be formed without direct electrical coupling of front distribution box 202 with rear distribution box 204; rather, the coupling is indirect (for example, as shown in FIG. 2A, via the various battery packs 222, 224, 226 comprising battery assembly 250). Such a configuration substantially reduces the size of the cables needed in a battery system for an electrical vehicle by approximately half the length of cables required in conventional systems with a single distribution box. Consequently, the volume of cable material (for example, copper) required is also reduced by approximately half. Thus, such a configuration provides an advantage by reduction in weight on vehicle 100 and reducing the cost of manufacturing and/or operating vehicle 100. Finally, such a configuration also allows each distribution box 202 and 204 to operate independently of one another.

In exemplary embodiments, battery assembly 250 may include multiple battery packs 124. In the examples shown in FIG. 2C, battery assembly 250 includes nine battery packs 124. However, in other examples, battery assembly 250 may include a 3-pack configuration, a 4-pack configuration, a 6-pack configuration, a 12-pack configuration, or other battery pack 124 configurations. Each battery pack 124 includes at least two positive connectors and two negative connectors through which the battery pack 124 is electrically coupled to other components, such as other battery packs 124, current distribution components, or other electrical devices or components within vehicle 100. In one exemplary embodiment, a battery pack 124 comprises a first positive connector and a second positive connector, and a first negative connector and a second negative connector. In another exemplary embodiment, a battery pack 124 comprises a first, second, and third positive connector, and a first, second, and third negative connector. However, any suitable number of positive and/or negative connectors for a battery pack 124 may be utilized, as desired.

FIG. 2A illustrates an example embodiment of a 3-pack configuration of a battery assembly 250. That is, in one example, battery assembly 250 includes three battery packs 124 that may be coupled in parallel. For example, as shown in FIG. 2A, battery pack 222, battery pack 224, and battery pack 226 are electrically coupled in parallel with one another. Further, the three battery packs 124 are electrically coupled in parallel with front distribution box 202 and rear distribution box 204. In the example shown in FIG. 2A, front distribution box 202 is coupled to battery pack 222 by coupling positive connector 202-1 of front distribution box 202 to positive connector 222-1 of battery pack 222. Further, battery pack 222 is coupled to battery pack 224 by coupling a second positive connector 222-3 of battery pack 222 to positive connector 224-1 of battery pack 224. Similarly, battery pack 224 is coupled to battery pack 226 by coupling a second positive connector 224-3 of battery pack 224 to positive connector 226-1 of battery pack 226-3. Finally, battery pack 226 is coupled to rear distribution box 204 by coupling positive connector 226-3 with connector 204-1 located on rear distribution box 204.

The negative connectors of front distribution box 202, rear distribution box 204 and battery packs 222, 224, and 226 are further coupled to complete the circuitry. That is, rear distribution box 204 is coupled to battery pack 222 by coupling negative connector 204-2 of rear distribution box 204 to negative connector 222-2 of battery pack 222. Further, negative connector 222-4 of battery pack 222 is coupled to negative connector 224-2 of battery pack 224 and negative connector 224-4 of battery pack 224 is coupled to negative connector 226-2 of battery pack 226. Finally, battery pack 226 is coupled to front distribution box 202 by coupling negative connector 226-4 to of battery pack 226 to negative connector 202-2 of front distribution box 202. Thus, the three battery packs 222, 224, and 226 are electrically coupled in parallel with one another, and the 3-pack sub-assembly 220 is electrically coupled in parallel with front distribution box 202 and rear distribution box 204.

Electrical coupling of the three battery packs 222, 224, and 226 in such a manner can provide significant advantages. First, because the first battery pack 222 is directly coupled to front distribution box 202 at positive connector 222-1 and is further directly coupled to rear distribution box 204 at negative connector 222-2, the length of the cables in coupling the batteries with one another is significantly reduced in comparison with distribution of power directly from rear to front and/or front to rear. In exemplary embodiments, the length of the cables are reduced by approximately half the length of cables used in conventional systems. As used herein, "directly coupled,", "directly connected" and/or the like mean components being coupled with electrical wires therebetween (but without intervening components). Thus, for example, a hypothetical component A and component B, connected to one another by one continuous section of wire (i.e., an arrangement like this: A← - - - →B), would be "directly connected." So, for example, routing a wire from a positive terminal of one battery pack to a negative terminal of another battery pack makes those two battery packs "directly connected." However, hypothetical components C and E, connected to one another through wires that utilize a current path passing through an intervening component D (such as a battery) (i.e., an arrangement like: C← - - - →D← - - - →E), may be electrically connected but are not considered "directly connected."

Figure 2B:
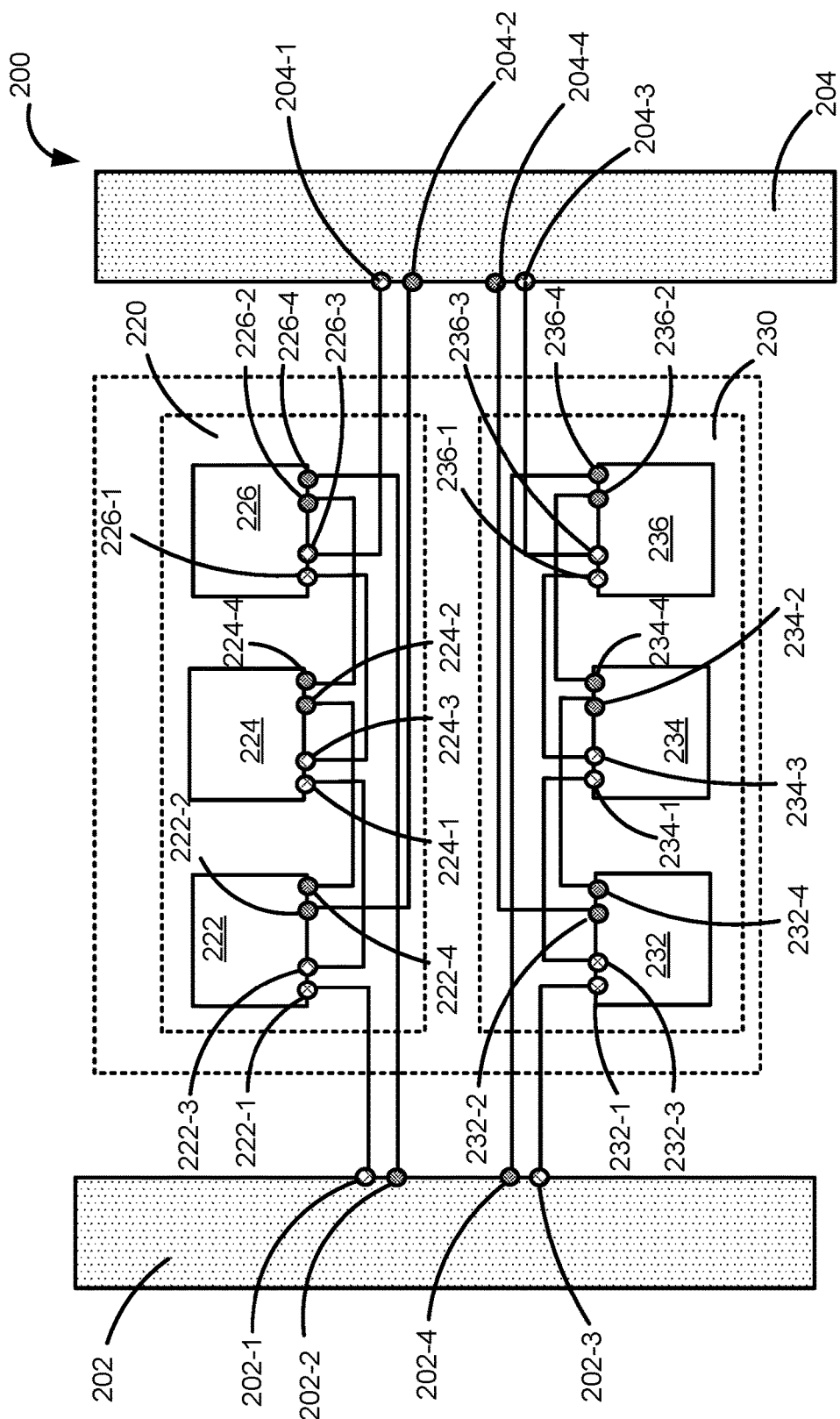
FIG. 2B illustrates a block diagram of an example high voltage electric system including a battery assembly with a 6-pack configuration, in accordance with various embodiments.

In exemplary embodiments, battery assembly 250 includes a 6-pack configuration. FIG. 2B illustrates an example of such an embodiment. As shown in FIG. 2B, a 6-pack configuration of battery assembly 250 includes two 3-pack sub-assemblies 220 and 230. Sub-assembly 220 is electrically coupled to front distribution box 202 and rear distribution box 204 in a manner similar to the approach shown in FIG. 2A. In addition to the three battery packs 222, 224, and 226, the 6-pack configuration further comprises battery packs 232, 234, and 236. Sub-assembly 230 comprising battery packs 232, 234, and 236 is electrically coupled to front distribution box 202 and rear distribution box 204 in a manner similar to sub-assembly 220.

As shown in FIG. 2B, in this embodiment front distribution box 202 includes two additional connectors 202-3 and 202-4, and rear distribution box 204 also includes two additional connectors 204-3 and 204-4, for use in electrical coupling with sub-assembly 230. Front distribution box 202 is coupled to battery pack 232 by coupling a positive connector 202-4 of front distribution box 202 to positive connector 232-1 of battery pack 232. Further, battery pack 232 is coupled to battery pack 234 by coupling a second positive connector 232-3 of battery pack 232 to positive connector 234-1 of battery pack 234. Similarly, battery pack 234 is coupled to battery pack 236 by coupling a second positive connector 234-3 of battery pack 234 to positive connector 236-1 of battery pack 236-3. Finally, battery pack 236 is coupled to rear distribution box 204 by coupling positive connector 236-3 with connector 204-3 on rear distribution box 204.

The negative connectors of front distribution box 202, rear distribution box 204, and battery packs 232, 234, and 236 are further coupled to complete the circuitry. Accordingly, rear distribution box 204 is coupled to battery pack 232 by coupling negative connector 204-4 of rear distribution box 204 to negative connector 232-2 of battery pack 232. Further, negative connector 232-4 of battery pack 232 is coupled to negative connector 234-2 of battery pack 234, and negative connector 234-4 of battery pack 234 is coupled to negative connector 236-2 of battery pack 236. Finally, battery pack 236 is coupled to front distribution box 202 by coupling negative connector 236-4 to of battery pack 236 to negative connector 202-2 of front distribution box 202. Thus, the three battery packs 232, 234, and 236 are electrically coupled in parallel with one another, and sub-assembly 230 is electrically coupled in parallel with front distribution box 202 and rear distribution box 204. Furthermore, sub-assembly 220 and sub-assembly 230 are also electrically coupled in parallel with one another. Consequently, in an exemplary embodiment, all six battery packs 222, 224, 226, 232, 234, and 236 in battery pack 250 are electrically coupled in parallel circuitry.

Figure 2C:
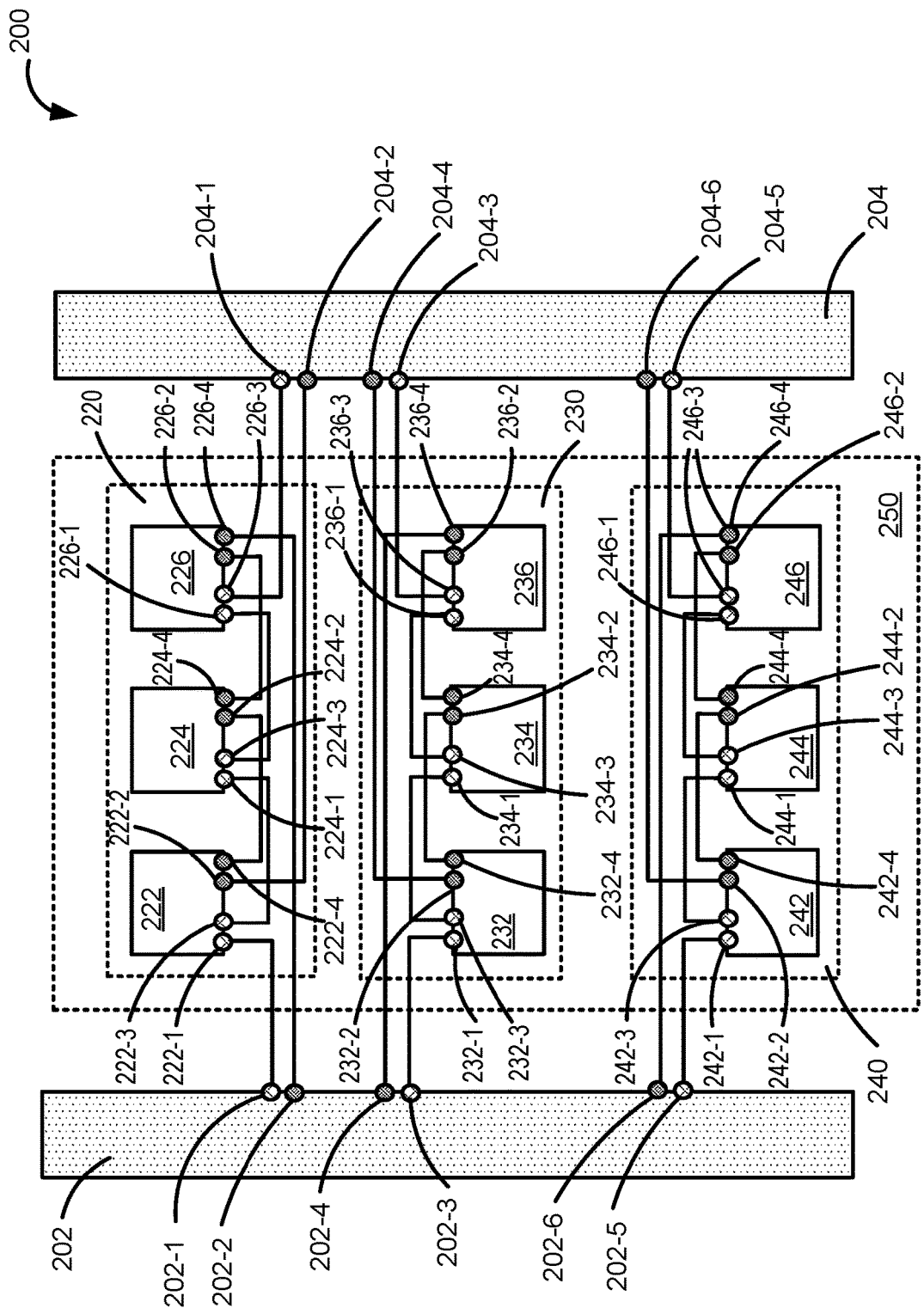
FIG. 2C illustrates a block diagram of a high voltage electric system including a battery assembly with a 9-pack configuration, in accordance with various embodiments.

FIG. 2C illustrates an example embodiment of a battery assembly 250 having a 9-pack configuration. In the example shown in FIG. 2C, the 9-pack configuration comprises 3-pack sub-assemblies 220 and 230 illustrated in FIGS. 2A and 2B. In addition, a third 3-pack sub-assembly 240 is included in the 9-pack configuration of battery assembly 250. Sub-assembly 240 includes three battery packs 242, 244, and 246. In exemplary embodiments, battery packs 242, 244, and 246 are electrically coupled in parallel with one another. Sub-assembly 240 is further electrically coupled to front distribution box 202 at positive connector 202-5 and negative connector 202-6, and rear distribution box 204 at positive connector 204-5 and negative connector 202-6 in a manner similar to sub-assemblies 220 and 230. Accordingly, front distribution box 202 is directly coupled to battery pack 242 (via positive connectors 202-5 and positive connector 242-1), battery pack 242 is coupled to battery pack 244 (via positive connectors 242-3 and 244-1, and negative connectors 242-4 and 244-2), battery pack 244 is coupled to battery pack 246 (via positive connectors 244-3 and 246-1, and negative connectors 244-4 and 246-2), battery pack 246 is directly coupled to rear distribution box 204 (via positive connector 246-3 and connector 204-5), battery pack 242 is coupled to rear distribution box 204-6 (via negative connector 242-2 and negative connector 204-6), and battery pack 246 is coupled to front distribution box 202 (via negative connector 246-4 and 202-6).

Accordingly, front distribution box 202 and rear distribution box 204 include at least the same number of positive and negative connectors as the number of sub-assemblies in battery assembly 250. Thus, in a three sub-assembly configuration, each of front distribution box 202 and rear distribution box 204 include three positive connectors and three negative connectors for electrical coupling with each of the sub-assemblies 220, 230, and 240.

In exemplary embodiments, vehicle 100 may include nine battery packs 124. However, based on operational needs of vehicle 100 (such as range, peak power draw, maximum sustained power draw, thermal management of battery packs 124, and/or the like), a battery control unit of battery assembly 250 may be configured to operate vehicle 100 on a 3-pack or a 6-pack configuration (stated another way, while a certain number of battery packs 124 may be physically present in vehicle 100, from time to time operating parameters of vehicle 100 may result in a smaller number of battery packs 124 being utilized and/or operated). Accordingly, utility of battery assembly 250 may be customized without changing physical installation of the battery packs 124. In exemplary embodiments, as the operational needs of vehicle 100 change, the battery control unit of battery assembly 250 may be configured to operate one or more remaining battery packs 124.

Figure 2D:
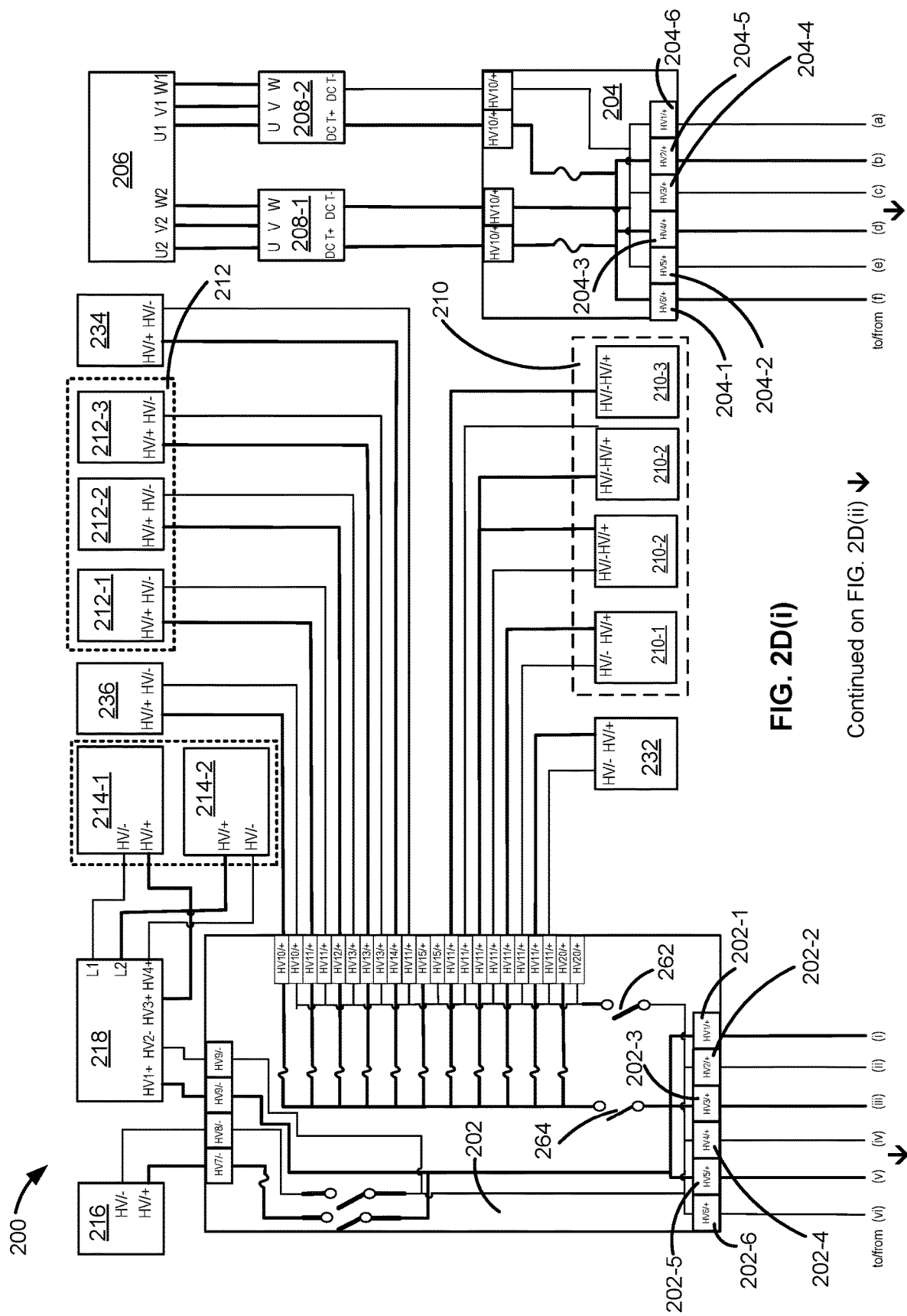
FIGS. 2D(i) and 2D(ii) illustrate a block diagram of a high voltage electric system including a battery assembly, in accordance with various embodiments.

FIGS. 2D(i) and 2D(ii) illustrate HV electrical system 200 with additional components that may be electrically coupled to front distribution box 202 and/or rear distribution box 204. In an exemplary embodiment, front distribution box 202, rear distribution box 204, and battery assembly 250 are electrically coupled in a manner similar to the embodiments illustrated in FIGS. 2A-2C.

Additionally, in various embodiments front distribution box 202 is configured to electrically couple to a charge port 216 and a brake resistor controller 218. Brake resistor controller 218 may be coupled to one or more brake resistors 214. In the example shown in FIGS. 2D(i) and 2D(ii), electrical current supplied by charge port 216 to front distribution box 202 is split to be received by battery packs 124 (e.g., battery packs 222, 224, 226, 232, 234, 236, 242, 244, 246) in battery assembly 250. In example embodiments, when battery packs 124 are connected in a parallel arrangement as disclosed above, current is split equally between the sub-assemblies, and thereafter divided equally between the battery packs 124 making up each sub-assembly. Consequently, in such an example, the voltage drop across each battery pack 124 is configured to be substantially equal. Accordingly, in such a parallel configuration of battery packs 124, each battery pack 124 is required to have only a portion of the capacity of a single battery pack used in a conventional system.

Moreover, the parallel coupling of individual battery packs (222-246) with one another, the parallel coupling of sub-assemblies (220, 230, and 240) with one another, and the parallel coupling of battery assembly 250 with front and rear distribution boxes 202 and 204 also allows for better modularity in achieving a desired current or power output. Further, the parallel coupling provides for ease in redundancy so that vehicle 100 may keep operating with additional safety.

For example, rear distribution box 204 is further electrically coupled to inverters 208-1 and 208-2 in parallel. Inverters 208-1 and 208-2 are further electrically coupled to an e-axle 206. Inverters 208-1 and 208-2 are configured to convert direct current (DC) from battery assembly 250 to alternating current (AC) to power the e-axle 206, which is operable to drive vehicle 100. In various exemplary embodiments, rear distribution box 204 receives electrical current supplied by sub-assemblies 220, 230, and 240, and that total supplied current is divided into two parts, with one part being delivered to inverter 208-1 and the other (typically, but not required to be, equal) part delivered to inverter 208-2.

Accordingly, during a crash event or during status monitoring of battery packs 124, if one or more of battery packs 124 experiences a discrepancy, fault, failure, error, or becomes inoperable or is damaged, a battery control unit of battery assembly 250 may instruct shut-off, disconnection, and/or isolation of all battery packs 124 comprising the sub-assembly that contains the malfunctioning battery pack (s) 124. As an example, vehicle 100 may experience a collision and damage to the left side of vehicle 100, leading to an unintended discharge in battery pack 242. In such an example, all of the battery packs 242, 244, and 246 in sub-assembly 240 may be disconnected. In exemplary embodiments, battery packs 242, 244 and 246 may be disconnected by opening a switch connecting the circuit that allows the current to flow through the respective battery pack 124. In exemplary embodiments, each battery pack 242, 244 and 246 may include a pyrofuse that is activated to break the circuit within the affected battery pack 124. However, in this example, because sub-assemblies 220 and 230 have not experienced any unintended damage, fault, or discrepancy, those two sub-assemblies may be configured to continue providing current to rear distribution box 204 and thus, maintain power supply to e-axle 206. Consequently, vehicle 100 may continue to operate and may be driven to safety post-collision. Thus, the parallel coupling provides for ease in redundancy so that vehicle 100 may keep operating with additional safety.

Further, along with being coupled to battery assembly 250, front distribution box 202 is electrically coupled to other components within vehicle 100. As shown in FIG. 2B, front distribution box 202 may be electrically coupled to components such as AC compressor 236, air compressor 232, and battery A/C compressor 234. Further, front distribution box 202 may be electrically coupled to one or more heaters 212 (e.g., HVAC heater 212-1, battery heaters 212-2 and 212-3, and/or the like) and/or to one or more converters 210 (such as DC/DC converters 210-1, 210-2, and 210-3). In exemplary embodiments, one or more of these components are coupled in parallel with battery assembly 250 through front distribution box 202.

As shown in FIGS. 2D(i) and 2D(ii), one or more vehicle 100 components are connected to battery assembly 250 through front distribution box 202 and one or more vehicle 100 components are connected to battery assembly 250 through rear distribution box 204. Thus, front distribution box 202 and rear distribution box 204 are not directly coupled to one another. Accordingly, in exemplary embodiments, both front distribution box 202 and rear distribution box 204 can operate independently of one another. For example, if for any reason, front distribution box 202 becomes non-operational, components (such as an e-axle 206) coupled to rear distribution box 204 remain unaffected. In this manner, failure of a certain portion or portions of vehicle 100 is prevented from completely disabling vehicle 100, potentially allowing vehicle 100 to move under its own power to a safe location and/or reach a service location.

Figure 3:
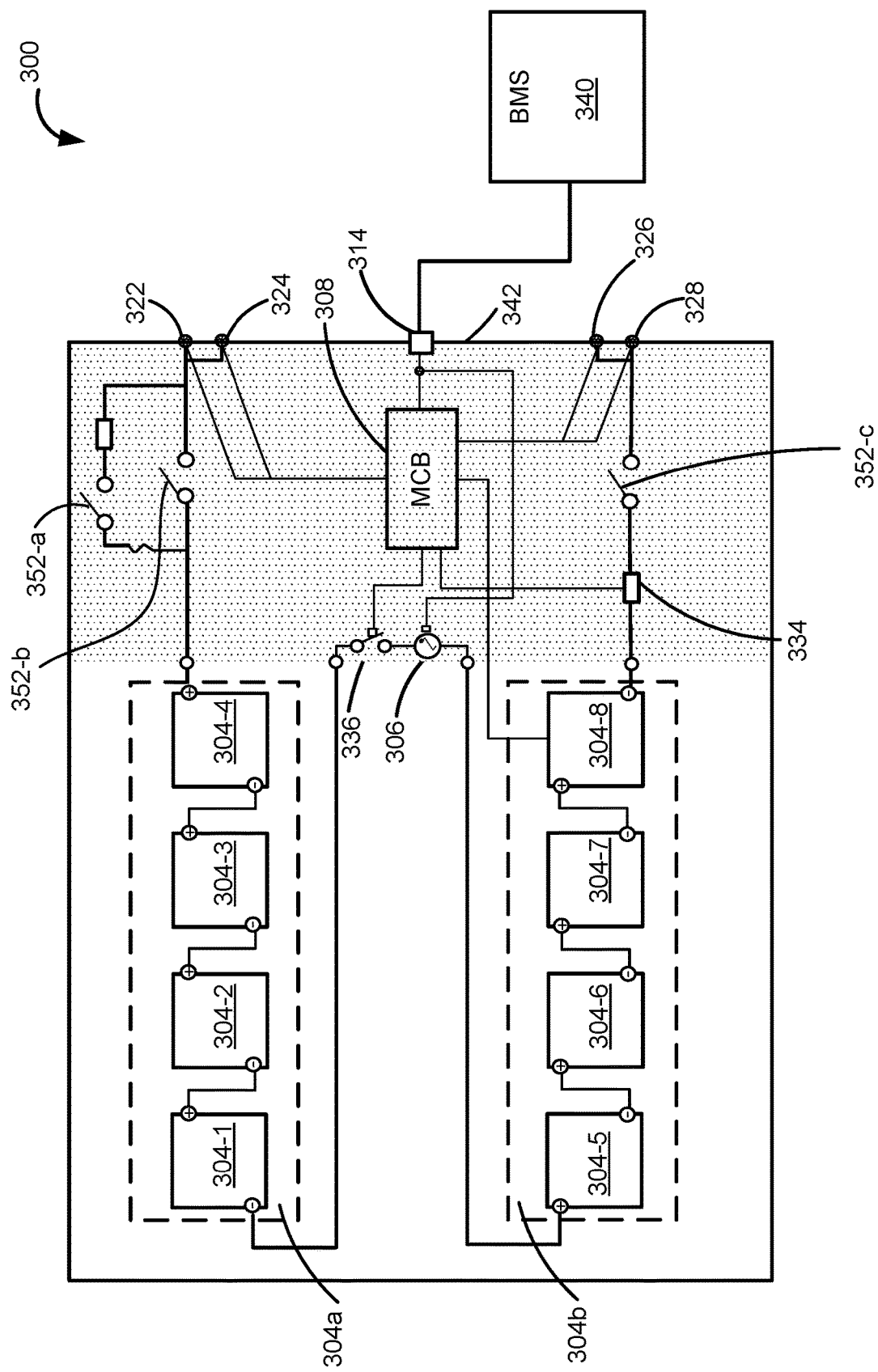
FIG. 3 illustrates a block diagram of one example of an individual battery pack in a battery assembly, in accordance with various embodiments.

Turning now to FIG. 3, in various exemplary embodiments a battery pack, such as battery pack 300, is configured with various internal and/or external control and/or safety components. FIG. 3 illustrates an electrical configuration of a battery pack 300 such as one included in battery assembly 250, in accordance with various embodiments described herein. For example, battery pack 300 can be used as any of battery packs 222-246 shown in FIGS. 2A-2D. Battery pack 300 may include one or more battery modules 304. In the example shown in FIG. 3, battery pack 300 includes eight modules 304 (304-1 through 304-8). These battery modules 304 may be electrically coupled to one another in parallel, in series, or combinations thereof. In the example of FIG. 3, modules 304-1 through 304-4 are connected in series with one another to form module assembly 304a, and modules 304-5 through 304-8 are connected in series with one another to form module assembly 304b. Thus, module assembly 304a is configured with a voltage equal to the sum of the voltages of modules 304-1 through 304-4, and module assembly 304b is configured with a voltage equal to the sum of the voltages of modules 304-5 through 304-8.

Further, module assembly 304a (including modules 304-1 to 304-4) is connected in series with module assembly 304b (including modules 304-5 to 304-8) through a fuse 306. In exemplary embodiments, fuse 306 is a pyrofuse, but any other suitable fuse may be used as based on the operational needs of battery pack 300 and/or vehicle 100. Current may be received at positive connector 324. This current (or a portion thereof) may: (i) pass through the circuit within battery pack 300 formed by modules 304-1 through 304-8, and/or (ii) exit battery pack 300 via positive connector 322.

Positive connector 322 may be electrically coupled to another component of vehicle 100 such as front distribution box 202, rear distribution box 204, and/or another battery pack 300 such that the outgoing current is received by one or more of these components of vehicle 100. In exemplary embodiments, positive connector 322 may be coupled to module 304-4 via an electrical switch or switches such as 352-a and 352-b. When at least one of electrical switch 352-a or 352-b is in a closed position, the current received at positive connector 322 may pass through the circuit within the battery pack. The current to run through battery pack 300 runs through the modules 304-1 to 304-8 connected in series. Accordingly, the current passing through modules 304-1 to 304-8 is the same for each module 304 and is equal to the lowest current capability of any of the modules 304.

Current flowing through the series arrangement of modules 304 in battery pack 300 is combined with any incoming current received at negative connector 326. Negative connector 326 is coupled to negative connector 328, and any current received at negative connector 326 exits the battery pack through negative connector 328. Negative connector 326 may be electrically coupled to one or more components of vehicle 100, such as front distribution box 202, rear distribution box 204, and/or another battery pack 300. The summed current (or a portion thereof) may depart battery pack 300 through negative connector 328 to be received by other components of vehicle 100 such as front distribution box 202, rear distribution box 204, and/or another battery pack 300. In exemplary embodiments, negative connector 328 may be coupled to module 304-8 via an electrical switch such as 352-c. When electrical switch 352-c is in a closed position, the current received from module 304-8 exits the battery pack through negative connector 328.

In exemplary embodiments, each battery module 304 is configured to operate at a voltage of between about 65V and about 100V. However, any suitable operating voltage range for a battery module 304 may be utilized, for example depending on cell count, internal series and/or parallel battery cell connections in battery module 304, cell chemistry, and/or the like. Battery module 304 may be configured with a storage capacity of between about 100 Amp-hours (Ah) and about 130 Ah. However, any suitable amp-hour configuration may be utilized, as desired. In various exemplary embodiments, battery module 304 is configured to provide a net energy storage of between about 6.5 kWh and about 13 kWh. In exemplary embodiments, each battery module 304 is capable of operating at a max continuous charge rate of between 0.5 C to 1.5 C. In various exemplary embodiments, the nominal voltage drop through each module 304 is between about 85 V and about 90 V, or further, approximately 87 V; the charge capacity of each module 304 is between about 110 Ah and about 120 Ah, or further, approximately 115 Ah. Consequently, in these embodiments each module 304 is configured to store about 10 kWh of energy.

Thus, in the example shown in FIG. 3, because battery pack 300 includes eight battery modules 304 connected in series, battery pack 300 has a charge capacity of between about 100 Ah and about 130 Ah. In a particular embodiment, the capacity of the battery pack may be about 115.20 Ah. Further, battery pack 300 operates at a voltage of between about 520V and about 800V. Consequently, battery pack 300 is configured to store a net energy of between about 60 kWh and about 92 kWh. In a particular embodiment, battery pack 300 is configured to store a net energy of about 80 kWh.

Battery pack 300 further includes at least one pack battery management system (BMS) 340. In various embodiments, BMS 340 controls and manages the operation of battery pack 300. BMS 340 may communicate with various components of battery pack 300, as well as various control units responsible for management of other components of vehicle 100. For example, BMS 340 may be coupled to battery management control unit (such as, master BMS 140) responsible for operation of a battery assembly 120 including multiple battery packs 124. In exemplary embodiments, BMS 340 is coupled to the battery pack 300 through an electrical junction. In some exemplary embodiments, BMS 340 is coupled to the battery pack 300 via a low voltage junction 314. In exemplary embodiments, low voltage junction 314 may be used to connect battery pack 300 to other components of the battery assembly and/or the high voltage system comprising battery pack 300.

In various examples, BMS 340 is coupled to a circuit breaker, such as miniature circuit breaker (MCB) 308. MCB 308 is operable to monitor a status of battery pack 300 and disconnect portions thereof (for example, battery module 304a and/or 304b) when a discrepancy, fault, damage, or other non-nominal condition is detected or anticipated. For example, battery pack 300 may include a current shunt 334 electrically coupled in series between module 304-8 and negative connector 326/328, and may be further configured to monitor one or more characteristics of outgoing current from battery pack 300. Current shunt 334 may be further coupled to MCB 308 for one or two-way communication, and a measured current level associated with battery pack 300 may be communicated to MCB 308. In various embodiments, this information may be used by MCB 308 to determine any discrepancy, glitch, fault, or failure in operation of battery pack 300. This information may further be shared with BMS 340, which may handle further communication with other relevant components of vehicle 100.

In some embodiments, MCB 308 is coupled to a manual service disconnect (MSD) switch 336. Based at least in part on operational needs of vehicle 100, MCB 308 may communicate to MSD switch 336 to electrically couple sub-assembly 304a to pyrofuse 306. Alternatively, MCB 308 may communicate to MSD switch 336 to open and disconnect the circuit. For example, MCB 308 may receive a signal indicating a discrepancy, fault, or failure in operation of battery pack 300. In such a circumstance, MCB 308 may communicate to MSD switch to open 336 and break the circuit, in order to at least partially isolate or disconnect battery pack 300 from rest of battery assembly 120 in vehicle 100. In some examples, MSD switch 336 is in an open position and MCB 308 may receive a signal indicating that MSD switch 336 can be closed to electrically couple sub-assembly 304a to pyrofuse 306 and thus activate/connect battery pack 300.

In exemplary embodiments, BMS 340 may receive a signal indicating that an emergency situation has been detected and as a result, one or more circuits in battery pack 300 should be opened/broken/disconnected in order to isolate battery pack 300 (or other components of vehicle 100, for example other battery packs 300) from damage or further damage. Emergency situations may include cases where there is a possibility of battery fire, high voltage discharge, chemical leak, and/or the like. These emergency situations may arise due to an impact or near impact with vehicle 100, for example in a crash event. A sensor or sensors may be installed to measure variables associated with such an event, and such a sensor may send a signal to BMS 340. In various embodiments, when battery pack 300 is desired to be isolate or transitioned to an inoperable or shut-down state, BMS 340 communicates a corresponding signal to MCB 308 which in turn sends a signal to MSD 336 to open and disconnect/break the circuit if battery pack 300 is desired to be isolated or transitioned to an inoperable or shut-down state. In exemplary embodiments, battery pack 300 includes a transceiver that receives the signal indicating that an emergency situation has been detected. In further exemplary embodiments, the transceiver may be coupled to MCB 308.

In various example embodiments, when a signal indicating an emergency situation has been received by BMS 340, BMS 340 communicates a signal 342 to pyrofuse 306. Signal 342 is an indication to activate pyrofuse 306. Consequently, the bus within pyrofuse 306 connecting module assembly 304a to module assembly 304b is broken responsive to signal 342 being received. Accordingly, battery pack 300 ceases functioning after pyrofuse 306 is activated. A signal indicating that a circuit path within battery pack 300 has been broken/opened may also be communicated back to BMS 340. Thus, in exemplary embodiments, either MCB 308 and/or pyrofuse 306 may be used as a safety mechanism to at least partially isolate and/or disconnect battery pack 300 from the remaining battery packs 300 in battery assembly 120. Accordingly, in exemplary embodiments, when a signal sent to MCB 308 fails or if MSD switch 336 fails to open the circuit connecting module sub-assembly 304a and 304b and thus stop current outflow originating in battery pack 300, a signal may be sent to activate pyrofuse 306 and thus break the circuit.

When a particular battery pack (e.g., a battery pack 300) is operating at a higher voltage than other battery packs (e.g., other battery packs 300) in a battery assembly (e.g., battery assembly 120), safety concerns may arise. Because the remaining battery packs 300 are operating at a lower voltage and because of the substantial capacity of each individual battery pack 300, due to the parallel connections therebetween the battery pack 300 having the higher/highest voltage may discharge current in a manner that charges at least one of, and potentially all of, the remaining battery packs 300 simultaneously. This may result in an excess demand condition for the highest voltage battery pack 300, causing an excessive current draw therefrom and damaging that battery pack 300. Accordingly, in exemplary systems disclosed herein it is desirable that all battery packs 300 operate at a same (or very similar) voltage and state of charge (SOC). In various embodiments, a master BMS 140 associated with battery assembly 120 and a BMS 340 of each individual battery pack 300 communicate with one another periodically, and may assist with maintaining voltage and/or state of charge in each battery pack 300. Thus, in exemplary embodiments, operation and management of individual battery pack 340 is controlled based on communication to and from master BMS 140.

Figure 7:
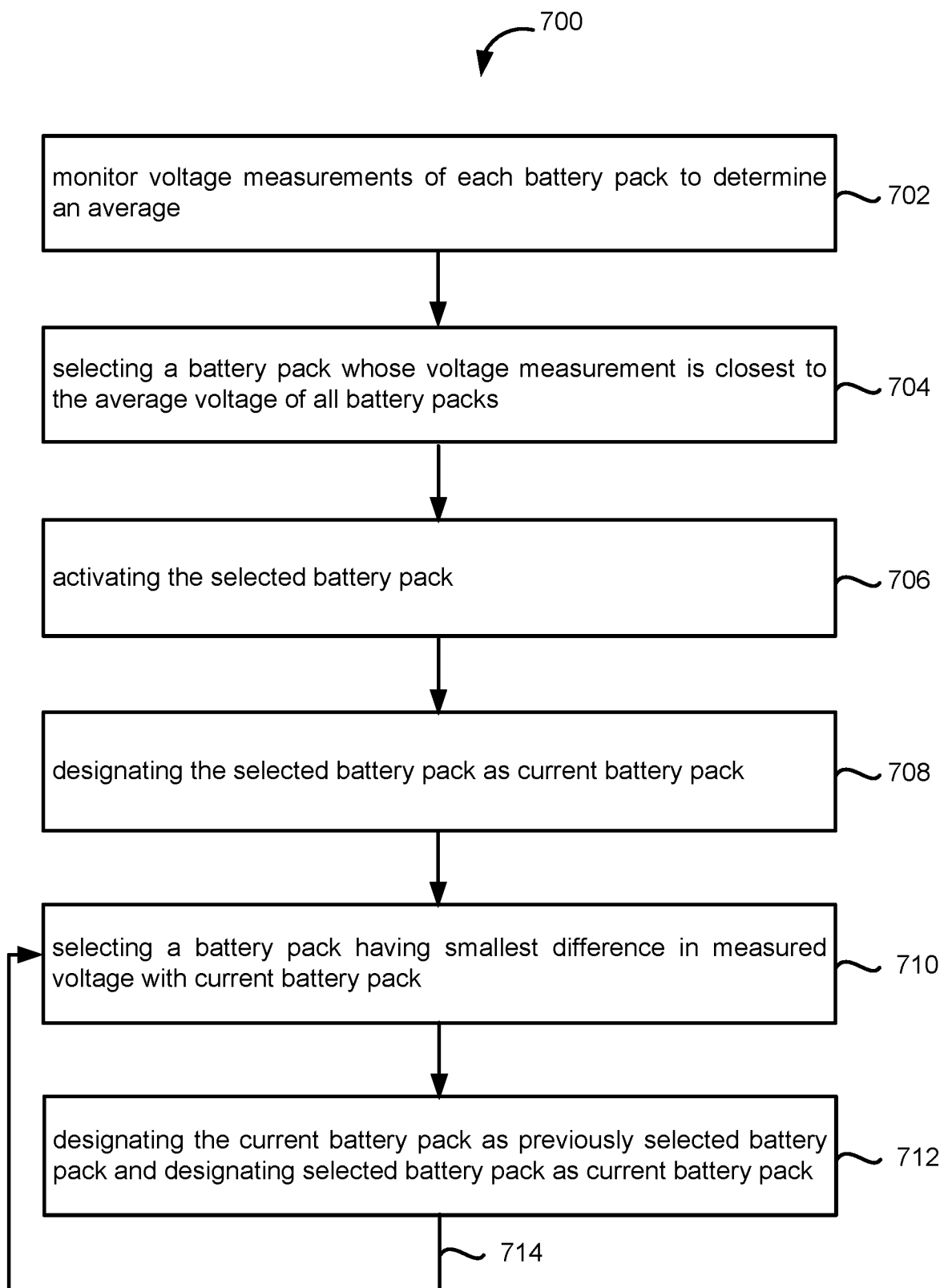
FIG. 7 illustrates a flow diagram of an exemplary embodiment of a method for controlling a battery assembly, in accordance with various embodiments.

Accordingly, referring now to FIGS. 1 and 7, each battery pack 124 of battery assembly 120 is intended to start operation at substantially the same SOC. Each BMS 126 is configured to periodically receive voltage measurements of its respective battery pack 124. These measurements are then communicated to master BMS 140. FIG. 7 illustrates an exemplary control method implemented in a configuration such as the one illustrated in FIG. 1. In a first step of a control method 700, master BMS 140 monitors the voltage measurements of each battery pack 124 and determines an average voltage of all the battery packs 124 in battery assembly 120 (step 702). In a next step of the control method 700, master BMS 140 selects the battery pack 124 (for example, battery pack 124-1) whose voltage measurement is closest to the average voltage of all battery packs 124 (step 704). In exemplary embodiments, the battery pack 124 having a voltage that is closest to the average voltage of all battery packs 124 is selected by determining a difference between the average voltage and a voltage measurement for each battery pack 124 in battery assembly 120. Master BMS 140 designates this battery pack 124 (for example, battery pack 124-1 in this scenario) as the "selected" battery pack 124. In a next step of control method 700, master BMS 140 transmits a signal to BMS 126-1 indicating that the "selected" battery pack 124-1 can be activated (step 706). In exemplary embodiments, when a battery pack 124-1 is activated, battery pack 124-1 is configured to close the circuit, and allow current to flow through its internal circuit. For example, BMS 126-1 may transmit a signal to its MCB (e.g., MCB 308-1) to close an MSD switch (e.g., MSD switch 336-1) and thus activate battery pack 124-1. In exemplary embodiments of control method 700, after an activation signal has been transmitted, the designation of the "selected" battery pack (124-1) is updated to the "current" battery pack (step 708).

In exemplary embodiments, it may be determined that multiple battery packs 124 (for example, battery packs 124-1 and 124-8) have the same voltage and are equally close to the average voltage measurement. In such a situation, BMS 140 selects all such battery packs 124 (for example 124-1 and 124-8), and transmits a signal to respective pack BMSs 126-1 and 126-8 indicating that the selected battery packs 124-1 and 124-8 may be activated. In such an exemplary embodiment, after activation thereof, only one of all the "selected" battery packs 124 may be designated as the "current" battery pack 124.

In a next step of a control method 700, master BMS 140 selects a battery pack 124 (for example, 124-2) that has a voltage measurement closest to the voltage measurement of "current" battery pack 124 (for example, 124-1) (step 710). In exemplary embodiments, master BMS 140 determines a difference between a voltage measurement of "current" battery pack 124 and voltage measurements of each of the remaining battery packs 124 (i.e., all battery packs 124 that are not yet activated), and BMS 140 selects a battery pack 124 (for example, 124-2) having the smallest difference in measured voltage with the "current" battery pack 124 (for example, 124-1).

In exemplary embodiments, master BMS 140 determines if the difference between the voltage measurement of the selected battery pack 124-2 and the voltage measurement of the current battery pack 124-1 is within a pre-determined threshold or distance. In exemplary embodiments when the nominal voltage of battery pack 120 is 800V, this pre-determined threshold may be within 12V, or within 10V, or within 8V. When the voltage difference is less than the pre-determined threshold, master BMS 140 transmits a signal to BMS 126-2 indicating that battery pack 124-2 may be activated. In a next step of control method 700, master BMS 140 designates the "current" battery pack 124-1 as a "previously selected" battery pack 124, and designates selected battery pack 124-2 as the "current" battery pack 124 (step 712).

In contrast, in exemplary embodiments, when the voltage difference is greater than the pre-determined threshold, steps may be taken to bring the difference between both battery packs 124 (124-1 and 124-2 in this example) within the pre-determined threshold. In exemplary embodiments, when a voltage measurement of selected battery pack 124-2 is higher than current battery pack 124-1, battery pack 124-1 may be configured to charge until its voltage measurement rises to a level such that the difference of voltage measurements between both battery packs 124 (124-1 and 124-2 in this example) is within the pre-determined threshold. In exemplary embodiments, when the voltage measurement of selected battery pack 124-2 is lower than that of current battery pack 124-1, current battery pack 124-1 is disconnected, and selected battery pack 124-2 may be configured to charge until its voltage measurement rises to a level such that the difference of voltage measurements between both battery packs 124 (124-1 and 124-2 in this example) is within the pre-determined threshold.

In exemplary embodiments, it may be determined that multiple battery packs 124 (for example, battery packs 124-2 and 124-9) have the same (or very similar) voltage and thus are equally close to the voltage measurement of current battery pack 124 (e.g., 124-1). In such a circumstance, BMS 140 selects all such battery packs 124 (e.g., 124-2 and 124-9), and transmits a signal to respective pack BMSs (126-4 and 126-9) indicating that the selected battery packs 124 (e.g., 124-2 and 124-9) may be activated. In such circumstance, thereafter only one of all the selected battery packs 124 (e.g., 124-2 and 124-9) is designated as the "current" battery pack 124.

In exemplary embodiments, in a next step of a control method 700, master BMS 140 determines if the voltage measurement of the "current" battery pack 124 (124-2) is higher than the voltage measurement of the previously selected battery pack 124 (124-1). When the voltage measurement of "current" battery pack 124-2 is higher than the voltage measurement of the previously selected battery pack 124-1, master BMS 140 selects a battery pack 124 (for example, 124-3) with a voltage measurement that is closest to that of the previously selected battery pack 124 (124-1) and lower than that of the previously selected battery pack 124 (124-1). When the voltage measurement of "current" battery pack 124 (124-2) is lower than the voltage measurement of the previously selected battery pack 124 (124-1), master BMS 140 selects a battery pack 124 (for example, 124-3) with a voltage measurement that is closest to that of the previously selected battery pack 124 (124-1) and which is greater than that of the previously selected battery pack 124 (124-1).

In further exemplary embodiments, master BMS 140 is configured to determine if the difference between the voltage measurement of the selected battery pack 124 (124-3) and the voltage measurement of the previously selected battery pack 124 (124-1) is within a pre-determined threshold. When the difference is smaller than the pre-determined threshold, master BMS 140 is configured to transmit a signal to BMS 126 (126-3) indicating that battery pack 124 (124-3) may be activated. Master BMS 140 is further configured to designate "current" battery pack 124 (124-2) as a previously selected battery pack, and master BMS 140 is also configured to designated selected battery pack 124 (124-3) as the "current" battery pack.

In a next step of a control method 700, master BMS 140 repeats the process from step 710 by selecting a battery pack 124 having the smallest difference in measured voltage with the current battery pack 124. Accordingly, BMS 140 determines if the voltage measurement of the "current" battery pack 124 (124-3) is higher than the voltage measurement of the previously selected battery pack 124 (124-2). When the voltage measurement of "current" battery pack 124 (124-3) is higher than the voltage measurement of the previously selected battery pack 124 (124-2), master BMS 140 selects a battery pack 124 (for example, 124-4) with voltage measurement that is closest to the that of previously selected battery pack 124 (124-2) and also lower than that of the previously selected battery pack 124 (124-2). When the voltage measurement of "current" battery pack 124 (124-4) is lower than the voltage measurement of the previously selected battery pack 124 (124-2), master BMS 140 selects a battery pack 124 (for example, 124-4) with voltage measurement that is closest to that of the previously selected battery pack 124 (124-2) and which is also greater than that of the previously selected battery pack 124 (124-2).

Continuing with this exemplary method, master BMS 140 determines if the difference between the voltage measurement of the selected battery pack 124 (124-4) and the voltage measurement of the previously selected battery pack 124 (124-2) is within a pre-determined threshold. When the difference is less than the pre-determined threshold, master BMS 140 transmits a signal to the BMS 126 of the selected battery pack 124 (i.e., BMS 126-4 in this example) indicating that the selected battery pack 124 (124-4) may be activated. After an activation signal to BMS 126-4 has been transmitted, BMS 140 designates "current" battery pack 124 (124-3) as a previously selected battery pack, and selected battery pack 124 (124-4) as the "current" battery pack 124. Corresponding process actions from step 710 are repeated until all battery packs 124 have been evaluated and/or activated. Master BMS 140 monitors all battery packs 124 to ensure that all of them may be activated when at a substantially similar or identical voltage level.

In exemplary embodiments, VCM 150 is configured to balance battery assembly 120 so that when vehicle 100 is in operation, all battery packs 124 in battery assembly 120 are operating at a same or very similar state of charge (SOC). In exemplary embodiments, when vehicle 100 is not in operation, VCM 150 is configured to periodically activate or "wake up" vehicle 100 (or portions thereof) and master BMS 140 is configured to monitor SOC of battery packs 124. In exemplary embodiments, VCM 150 is configured to periodically wake up vehicle 100 and master BMS 140 at pre-determined intervals to determine SOC of battery packs 124. As used herein, when vehicle 100 is "not in operation," vehicle 100 may be one or more of: (i) not in service, (ii) not being driven, (iii) at least partially powered down, and/or (iv) in similar inactive or non-operational conditions. Accordingly, in various exemplary embodiments, when vehicle 100 is not in operation, vehicle 100 may be configured to "wake up" (for example, at a regular interval, responsive to a timer or countdown, responsive to an external communication, at an interval at least partially based on and/or related to a previously measured SOC, and/or the like) and master BMS 140 is configured to monitor the SOC of battery packs 124. Accordingly, master BMS 140 is configured to transmit a signal to one or more pack BMS 126 to activate, check, assess, or otherwise monitor or evaluate one or more respective battery packs 124.

In exemplary embodiments, master BMS 140 compares the voltage levels of a pair of battery packs 124 (for example, 124-1 and 124-2) in battery assembly 120. When BMS 140 detects that battery packs 124-1 and 124-2 are operating at voltage levels that exceed a specified difference threshold, BMS 140 generates instructions that activate both battery packs 124-1 and 124-2. Current flowing therebetween causes battery packs 124-1 and 124-2 to level out at the same voltage. After battery packs 124-1 and 124-2 level out at the same voltage, master BMS 140 may compare voltage levels of a different pair of battery packs 124 in battery assembly 120 (for example, 124-2 and 124-3). When BMS 140 detects that battery packs 124-2 and 124-3 are operating at varying voltage levels beyond a difference threshold, BMS 140 activates both battery packs 124-2 and 124-3, and current flowing therebetween causes battery packs 124-2 and 124-3 to level out at the same voltage. Master BMS 140 may repeat this process any suitable number of times to compare the voltage levels of some or all possible pairs of battery packs 124 in battery assembly 120 until it determines that all battery packs 124 are operating at voltage levels within a specified difference level from one another.

Figure 4:
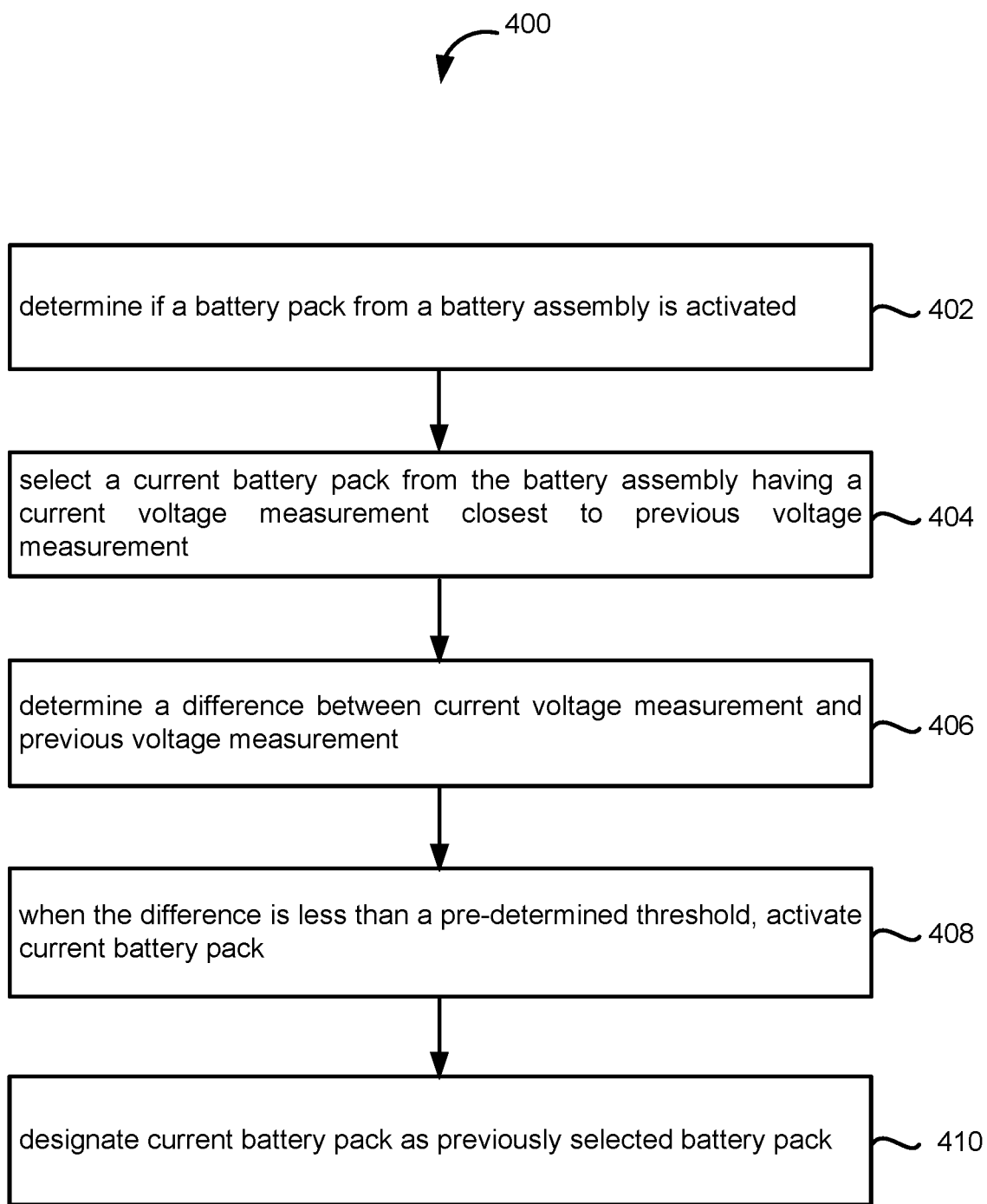
FIG. 4 illustrates a flow diagram of one exemplary embodiment of a method to maintain voltage in a battery assembly for a high voltage electrical system, in accordance with various embodiments.

Turning now to FIG. 4, illustrate is a flow diagram of one embodiment of a method 400 to maintain voltage in a battery assembly 120 of vehicle 100 as shown in FIGS. 1-3. However, method 400 may apply to other battery assemblies as well. In the example shown in FIG. 4, method 400 comprises determining if at least one battery pack 124 from the battery assembly 120 is activated (step 402). When at least one battery pack 124 from the battery assembly 120 is activated, method 400 further comprises selecting a current battery pack 124 from the battery assembly 120, and defining that battery pack 124 as having a current voltage measurement (step 404). The current voltage measurement is that which is closest to a previous voltage measurement. This previous voltage measurement is a measured voltage of a previously selected battery pack 124 that has been activated.

Method 400 further comprises determining a difference between the current voltage measurement and a previous voltage measurement (step 406). This difference is then compared with a pre-determined threshold. This pre-determined threshold may be stored in a memory (such as memory 142). When the difference is less than the pre-determined threshold, method 400 comprises activating the current battery pack (step 408). The current battery pack is designated as a previously selected battery pack (step 410).

Figure 5A:
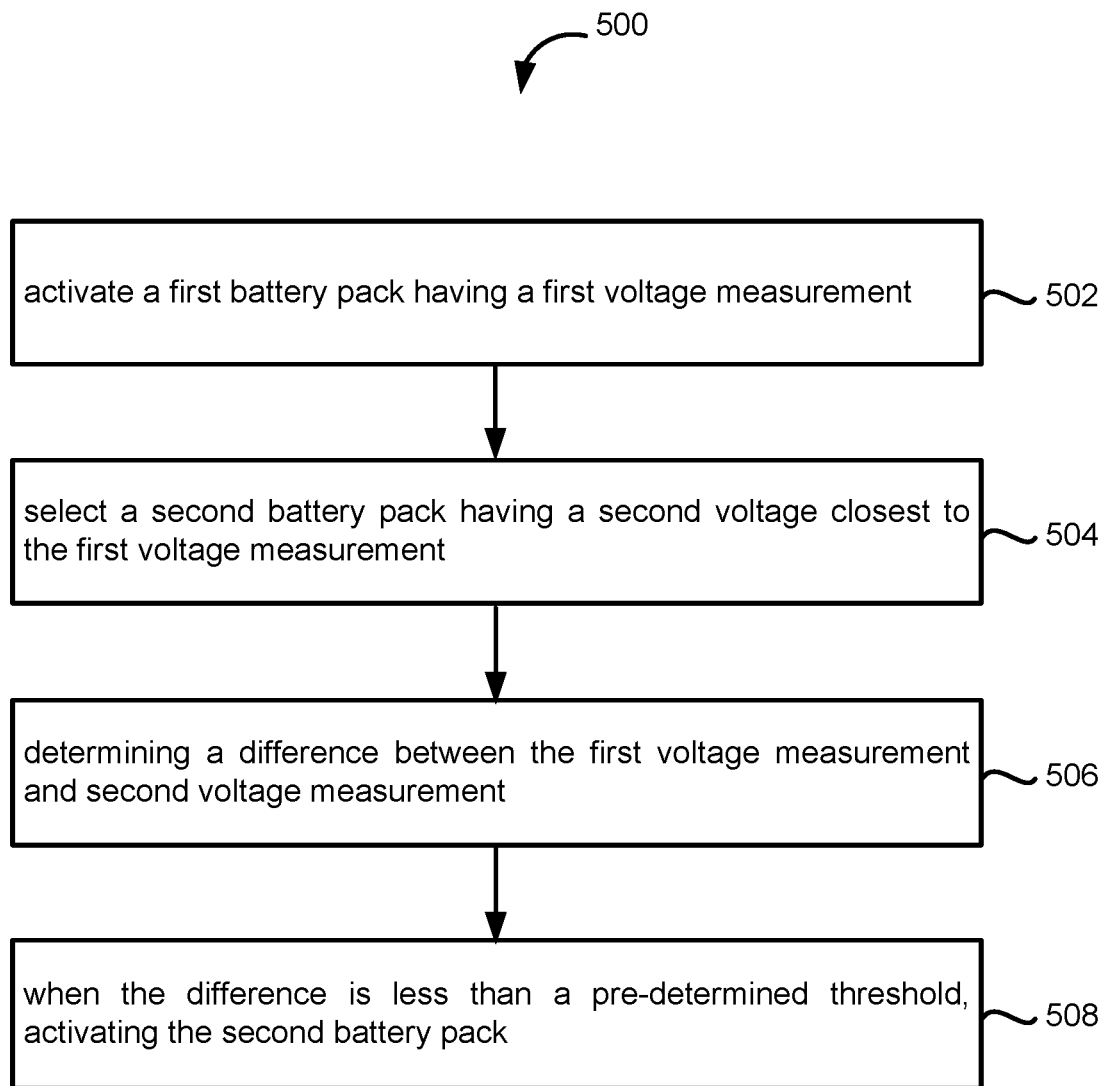
FIG. 5A illustrates a flow diagram of an exemplary embodiment of a method to maintain voltage in a battery assembly for a high voltage electrical system, in accordance with various embodiments.
Figure 5B:
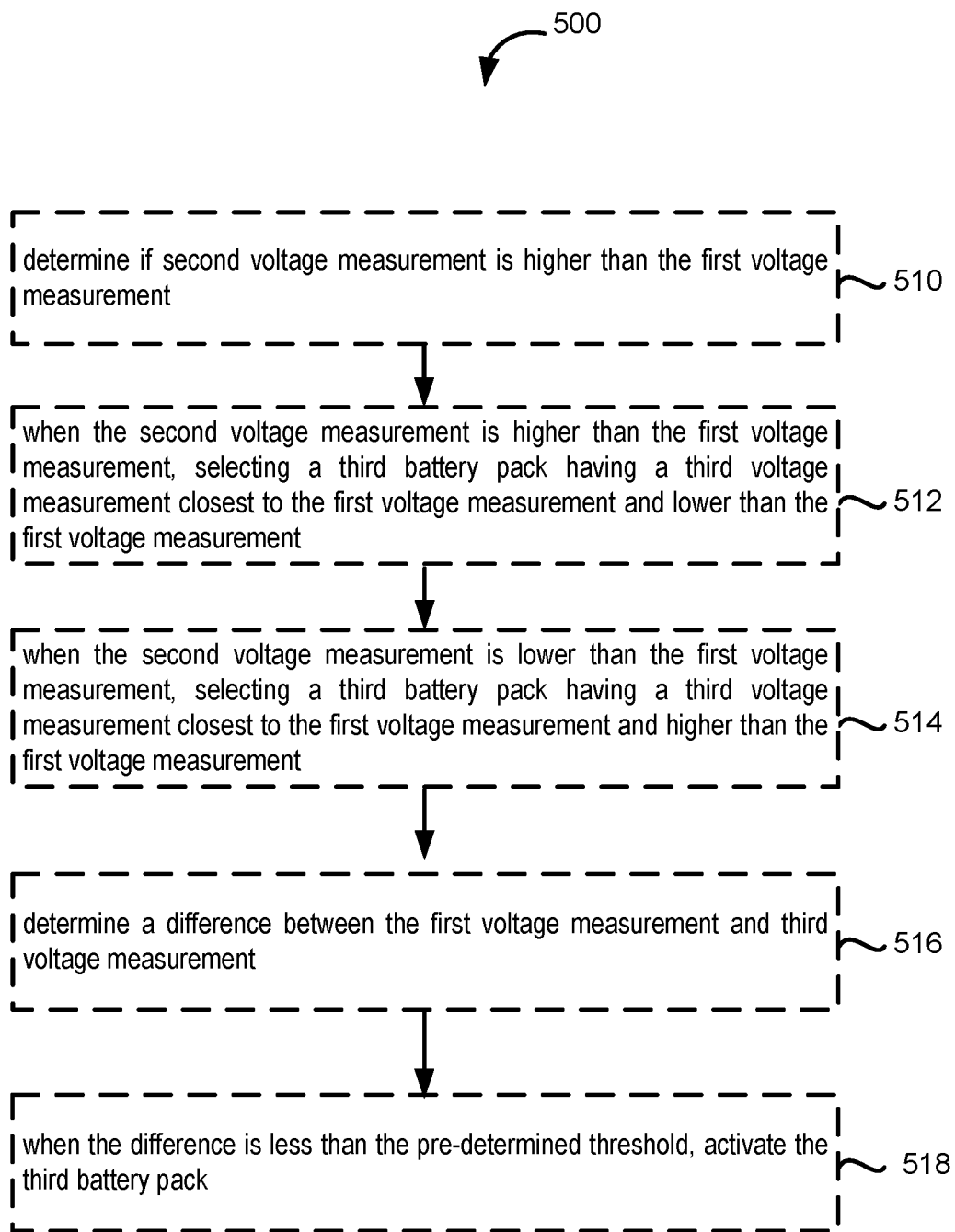
FIG. 5B illustrates a flow diagram of an exemplary embodiment of a method described in FIG. 5A, in accordance with various embodiments.

Turning now to FIGS. 5A and 5B, illustrated are flow diagrams of exemplary embodiments of a method 500 to maintain voltage in battery assembly 120 of vehicle 100 as shown in FIGS. 1-3. However, method 500 may apply to other battery assemblies as well. In the example shown in FIG. 5A, method 500 comprises activating (for example, via operation of BMS 140) a first battery pack 124 from the battery assembly 120 having a first voltage measurement (step 502). Activating the first battery pack 124 further comprises determining an average of voltage measurements of all battery packs 124 in the battery assembly 120 and selecting the first battery pack 124 from the battery assembly 120 with the first voltage measurement. In such an example, the first voltage measurement is closest to the average voltage measurement.

Method 500 further comprises selecting a second battery pack 124 from the battery assembly 120 having a second voltage measurement, wherein the second voltage measurement is closest to the first voltage measurement (step 504). Method 500 also comprises determining a difference between the first voltage measurement and the second voltage measurement (step 506). When the difference is less than a pre-determined threshold, method 500 comprises activating the second battery pack (step 508).

In some exemplary embodiments, with additional reference now to FIG. 5B, method 500 may further comprise determining if the second voltage measurement is higher than the first voltage measurement (step 510). Further, when the second voltage measurement is higher than the first voltage measurement, method 500 comprises selecting a third battery pack 124 having a third voltage measurement, wherein the third voltage measurement is closest to the first voltage measurement and lower than the first voltage measurement (step 512). Alternatively, when the second voltage measurement is lower than the first voltage measurement, method 500 comprises selecting a third battery pack 124 having a third voltage measurement, wherein the third voltage measurement is closest to the first voltage measurement and higher than the first voltage measurement (step 514). Method 500 further comprises determining a difference between the first voltage measurement and the third voltage measurement (step 516). When the difference is less than the pre-determined threshold, method 500 comprises activating the third battery pack 124 (step 518). It will be appreciated that similar steps may be repeated, as desired, until a desired number of battery packs 124 in battery assembly 120 have been activated.

Figure 6:
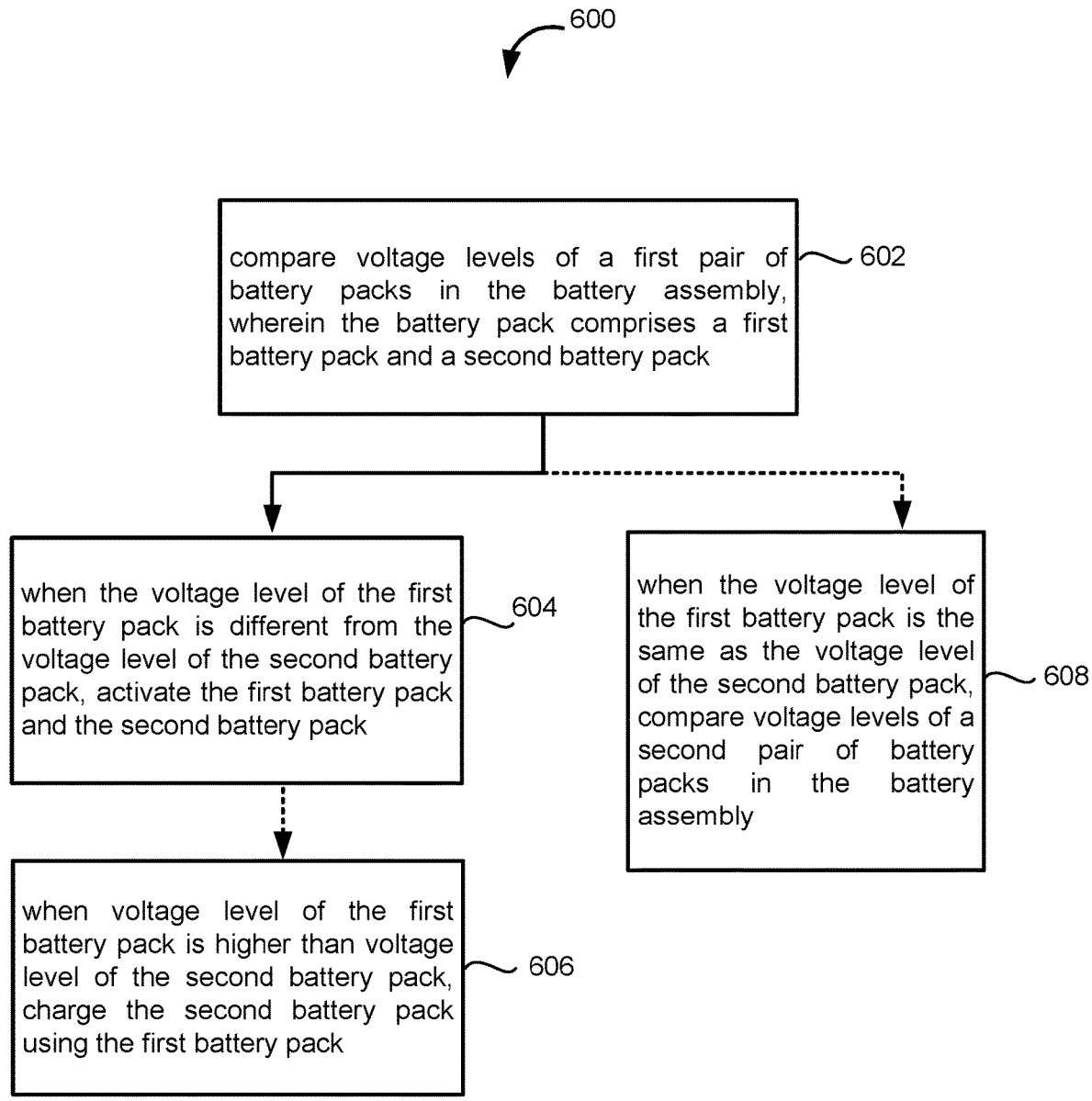
FIG. 6 illustrates a flow diagram of an exemplary embodiment of a method to balance voltage levels in a battery assembly for a high voltage electrical system, in accordance with various embodiments.

With reference now to FIG. 6, illustrated is a flow diagram of an embodiment of a method 600 to balance battery packs 124 in battery assembly 120 of vehicle 100 as shown in FIGS. 1-3. In exemplary embodiments of method 600, all battery packs 124 in battery assembly 120 begin in an inactive state. Method 600 comprises comparing voltage levels of a first pair of battery packs 124 in battery assembly 120. The first pair may comprise a first battery pack 124 and a second battery pack 124 (step 602). When the voltage level of the first battery pack 124 is different from the voltage level of the second battery pack 124 by at least a threshold amount, method 600 comprises activating the first battery pack 124 and the second battery pack 124 (step 604). In the event the voltage level of the first battery pack 124 is higher than the voltage level of the second battery pack 124, method 600 comprises charging the second battery pack 124 using the first battery pack 124 as the source for the charging current (step 606).

In the event the voltage level of the first battery pack 124 is the same as (or within a threshold amount of) the voltage level of the second battery pack 124, method 600 comprises comparing voltage levels of a second pair of battery packs 124 in battery assembly 120 (step 608). The second pair of battery packs 124 in battery assembly 120 may comprise or include at least one of the first battery pack 124 or the second battery pack 124. Alternatively, the second pair of battery packs 124 may comprise or include a third battery pack 124 and a fourth battery pack 124. It will be appreciated that similar steps may be repeated, as desired, until a desired number of battery packs 124 in battery assembly 120 have been balanced and/or leveled.

Figure 8:
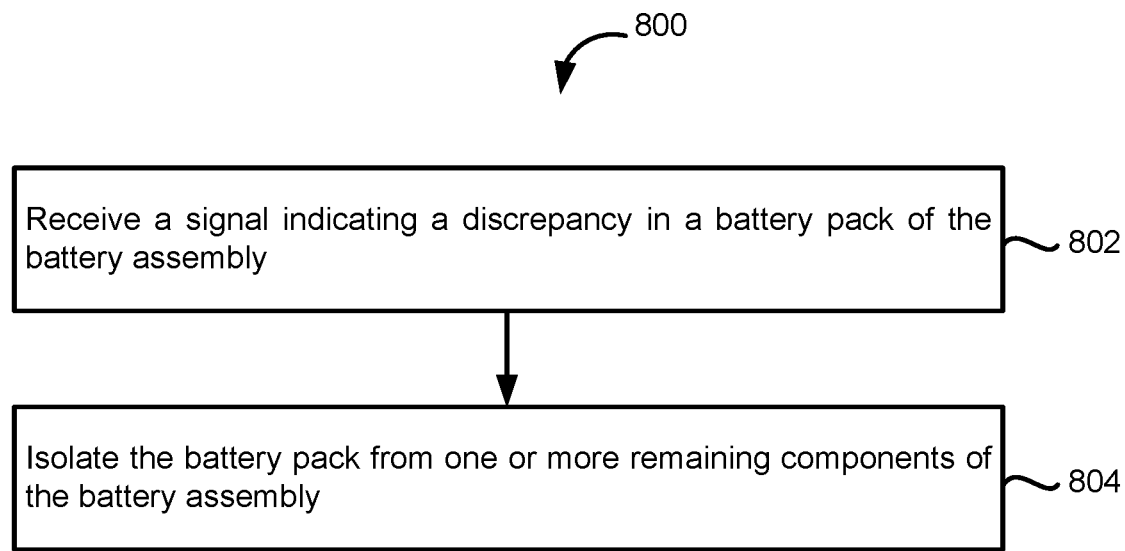
FIG. 8 illustrates a flow diagram of an exemplary embodiment of a method to balance voltage levels in a battery assembly for a high voltage electrical system, in accordance with various embodiments.

With reference now to FIG. 8, illustrated is a flow diagram of one embodiment of a method 800 to manage operation of battery assembly 120 of a vehicle 100 as shown in FIGS. 1-3. However, method 800 may be applicable to other battery assemblies as well. In the example shown in FIG. 8, method 800 comprises receiving a signal indicating a discrepancy in a battery pack, such as battery pack 300, of the battery assembly (step 802). After receiving such a signal, the next step of method 800 comprises isolating the battery back from one or more remaining components of the battery assembly (step 804).

In exemplary embodiments of method 800, the battery pack is isolated from remaining components of the battery assembly by disabling electrical coupling between a first battery module and a second battery module in the battery pack. In further exemplary embodiments, electrical coupling between a first battery module and a second battery module is disabled by communicating a signal to the battery pack to activate a pyrofuse and break a circuit path between the first battery module and the second battery module.

In some exemplary embodiments of method 800, the battery pack is isolated from remaining components of the battery assembly by disabling electrical coupling between the battery pack and remaining components of the battery assembly. In some exemplary embodiments of method 800, the battery pack is isolated from remaining components of the battery assembly by transitioning the battery pack to an inoperable state.

In exemplary embodiments of method 800, receiving a signal indicating a discrepancy in a battery pack of the battery assembly comprises receiving a signal that the battery pack is impacted by an emergency situation. In some exemplary embodiments of method 800, receiving a signal indicating a discrepancy in a battery pack of the battery assembly comprises receiving a signal that the battery pack is functioning abnormally in comparison to at least one other battery pack of the battery assembly.

Thus, the parallel coupling of individual battery packs (222-246) with one another, the parallel coupling of sub-assemblies (220, 230, and 240) with one another, and the parallel coupling of battery assembly 250 with front and rear distribution boxes 202 and 204 provides several advantages over conventional systems. First, coupling a battery assembly with two distribution boxes (such as front and rear distribution boxes 202 and 204) is cost effective and provides reduction in size and length of the cables used. Further, because the sub-assemblies (220, 230, and 240) are connected in parallel, based on operational needs of vehicle 100, utility of battery assembly 250 may be customized to use smaller number of battery packs than physically installed. Furthermore, parallel coupling of individual battery packs (222-246) also allows for better modularity in achieving a desired current or power output. Moreover, if one or more battery packs are detected as inoperable, the parallel coupling provides for ease in redundancy so that vehicle 100 may keep operating with additional safety using the remaining battery packs. Finally, controlling the battery packs 124 to operate at substantially same voltage level provides an increased advantage to life expectancy of each individual battery pack.

Principles of the Present Disclosure Contemplate the Following Example Embodiments Example 1 includes a high voltage (HV) electrical system for a vehicle, the HV electrical system comprising: a front distribution box having at least one front positive HV connector and at least one front negative HV connector; a rear distribution box having at least one rear positive HV connector and at least one rear negative HV connector; and a battery pack assembly comprising at least one battery pack, wherein battery pack assembly comprises at least two pack positive HV connectors and at least two negative HV connectors, wherein the front distribution box, the battery pack assembly, and the rear distribution box are electrically coupled in parallel, wherein the front positive HV connector is directly coupled to a first of the at least two pack positive HV connectors, wherein a second of the at least two pack positive HV connectors is directly coupled to the rear positive HV connector, wherein the rear negative HV connector is directly coupled to a first of the at least two pack negative HV connectors, and wherein a second of the at least two pack negative HV connectors is directly coupled to the front negative HV connector.

Example 2 includes the HV electrical system of Example 1, wherein the battery pack assembly comprises multiple battery packs, and wherein each of the multiple battery packs are electrically coupled in parallel with one another.

Example 3 includes the HV electrical system of any of Examples 1-2, wherein the battery pack assembly comprises a first battery pack, a second battery pack, and a third battery pack, wherein each of the first, second, and third battery packs has a first positive HV connector, a second positive HV connector, a first negative HV connector, and a second negative HV connector, wherein the front positive HV connector is directly coupled to the first positive HV connector of the first battery pack, the HV second positive connector of the first battery pack is directly coupled to the first positive HV connector of the second battery pack, the second positive HV connector of the second battery pack is directly coupled to the first positive HV connector of the third battery pack, and the second positive HV connector of the third battery pack is directly coupled to the rear positive connector, and wherein the rear negative HV connector is directly coupled to the first HV negative connector of the first battery pack, the second negative connector of the first battery pack is directly coupled to the first negative HV connector of the second battery pack, the second negative HV connector of the second battery pack is directly coupled to the first negative HV connector of the third battery pack, and the second negative HV connector of the third battery pack is directly coupled to the front negative connector.

Example 4 includes the HV electrical system of Example 3, wherein the front distribution box comprises a second front positive HV connector and a second front HV negative connector, and wherein the rear distribution box comprises a second rear positive HV connector and a second rear negative HV connector, wherein the battery pack assembly comprises a fourth battery pack, a fifth battery pack, and a sixth battery pack, wherein each of the fourth, fifth, and sixth battery packs has first positive HV connector, a second positive HV connector, a first negative HV connector, and a second negative HV connector, wherein the second front positive HV connector is directly coupled to the first positive connector of the fourth battery pack, the second positive connector of the fourth battery pack is directly coupled to the first positive connector of the fifth battery pack, the second positive connector of the fifth battery pack is directly coupled to the first positive connector of the sixth battery pack, and the second positive connector of the sixth battery pack is directly coupled to the second rear positive connector, and wherein the second rear negative HV connector is directly coupled to the first HV negative connector of the fourth battery pack, the second negative connector of the fourth battery pack is directly coupled to the first negative HV connector of the fifth battery pack, the second negative HV connector of the fifth battery pack is directly coupled to the first negative HV connector of the sixth battery pack, and the second negative HV connector of the sixth battery pack is directly coupled to the second front negative connector.

Example 5 includes the HV electrical system of Example 4, wherein the front distribution box comprises a third front positive HV connector and a third front HV negative connector, wherein the rear distribution box comprises a third rear positive HV connector and a third rear negative HV connector; wherein the battery pack assembly comprises a seventh battery pack, an eighth battery pack, and a ninth battery pack, wherein each of the seventh, eighth, and ninth battery packs has a first positive HV connector, a second positive HV connector, a first negative HV connector, and a second negative HV connector, wherein the third front positive HV connector is directly coupled to the first positive connector of the seventh battery pack, the second positive connector of the seventh battery pack is directly coupled to the first positive connector of the eighth battery pack, the second positive connector of the eighth battery pack is directly coupled to the first positive connector of the ninth battery pack, and the second positive connector of the ninth battery pack is directly coupled to the third rear positive connector, and wherein the third rear negative HV connector is directly coupled to the first HV negative connector of the seventh battery pack, the second negative connector of the first battery pack is directly coupled to the first negative HV connector of the eighth battery pack, the second negative HV connector of the eighth battery pack is directly coupled to the first negative HV connector of the ninth battery pack, and the second negative HV connector of the ninth battery pack is directly coupled to the third front negative connector.

Example 6 includes the HV electrical system of any of Examples 1-5, wherein the battery assembly further comprises at least one battery sub-assembly, each sub-assembly comprising multiple battery packs, wherein the front distribution box comprises a number of front positive HV connectors equal to the number of sub-assemblies and further comprises a number of front negative HV connectors equal to the number of sub-assemblies, wherein the rear distribution box comprises a number of rear positive HV connectors equal to the number of sub-assemblies and further comprises a number of rear negative HV connectors equal to the number of sub-assemblies, and wherein the front distribution box is electrically coupled to each of the sub-assemblies in parallel via a respective front positive connector and a respective front negative connector, and wherein the rear distribution box is electrically coupled to each sub-assembly in parallel via a respective rear positive connector and a respective rear negative connector.

Example 7 includes the HV electrical system of Example 6, wherein each of the sub-assemblies comprises at least three battery packs.

Example 8 includes the HV electrical system of any of Examples 1-7, wherein each of the at least one battery packs comprises: a plurality of battery modules, wherein a first module assembly comprises a first half of the plurality of battery modules and a second module assembly comprises a second half of the plurality of battery modules, and wherein the first module assembly is electrically coupled to the second module assembly; and a circuit breaking system electrically coupled to the first module assembly and the second module assembly such that, responsive to a signal, the circuit breaking system disables an electrical coupling between the first module assembly and the second module assembly.

Example 9 includes the HV electrical system of Example 8, wherein the circuit breaking system comprises a pyro fuse, wherein the pyro fuse is electrically coupled to the first module assembly in series at a first connector, wherein the pyro fuse is electrically coupled to the second module assembly in series at a second connector, and wherein, responsive to the signal, the pyro fuse breaks to disable the electrical coupling between the first module assembly and the second module assembly.

Example 10 includes the HV electrical system of Example 8, wherein the circuit breaking system comprises: a manual service disconnect (MSD) switch, wherein the MSD switch, in a closed position, electrically couples the first module assembly in series with the second module assembly; a miniature circuit breaker (MCB) coupled to the MSD switch, such that when the MCB transmits a signal to the MSD switch, the MSD switch flips to an open position to disable the electrical coupling between the first module assembly and the second module assembly.

Example 11 includes the HV electrical system of any of Examples 1-10, further comprising a master battery management system (BMS) electrically coupled to the battery assembly, wherein the master BMS is configured to receive and transmit signals to and from components of the battery assembly.

Example 12 includes the HV electrical system of Example 11, wherein each battery pack is electrically coupled to a pack BMS, wherein the pack BMS is configured to monitor operation of the corresponding battery pack, and wherein the pack BMS is configured to receive and transmit signals to and from the battery pack.

Example 13 includes the HV electrical system of Example 12, wherein the master BMS comprises instructions that, when executed by the master BMS responsive to receiving a signal indicating an emergency event associated with the battery assembly, cause the master BMS to: determine if one or more battery packs in the battery assembly are affected by the emergency event; and if a battery pack is affected, transmit a signal to the pack BMS of the affected battery pack to deactivate the affected battery pack.

Example 14 includes a method for maintaining voltage in battery assembly for a vehicle, the method comprising: activating a first battery pack from the battery assembly, wherein the battery assembly comprises a plurality of battery packs, and wherein the first battery pack has a first voltage measurement; selecting a second battery pack from the battery assembly, wherein the second battery pack has a second voltage measurement, and wherein the second voltage measurement is, among all other battery packs in the battery assembly, closest to the first voltage measurement; and activating the second battery pack.

Example 15 includes the method of Example 14, wherein selecting a second battery pack further comprises: determining a difference between the first voltage measurement and a voltage measurement of each of the remaining battery packs of the battery assembly; selecting the battery pack having the smallest difference as the second battery pack.

Example 16 includes the method of any of Examples 14-15, wherein activating the second battery pack comprises: determining a difference between the first voltage measurement and the second voltage measurement; and in the event the difference is less than a pre-determined threshold, activating the second battery pack.

Example 17 includes the method of any of Examples 14-16, further comprising:
determining if the second voltage measurement is higher than the first voltage measurement; in the event the second voltage measurement is higher than the first voltage measurement, selecting a third battery pack having a third voltage measurement, wherein the third voltage measurement is closest to the first voltage measurement and lower than the first voltage measurement; in the event the second voltage measurement is lower than the first voltage measurement, selecting a third battery pack having a third voltage measurement, wherein the third voltage measurement is closest to the first voltage measurement and higher than the first voltage measurement; and activating the third battery pack.

Example 18 includes the method of Example 17, further comprising: determining a difference between the first voltage measurement and the third voltage measurement; and in the event the difference is less than the pre-determined threshold, activating the third battery pack.

Example 19 includes the method of any of Examples 1-18, wherein activating the first battery pack further comprises: determining an average of voltage measurements of all battery packs in the battery assembly; and selecting the first battery pack from the battery assembly with the first voltage measurement, wherein the first voltage measurement is closest to the average voltage measurement; and activating the first battery pack.

Example 20 includes a method for maintaining voltage in battery assembly for a vehicle, the method comprising: determining if at least one battery pack from the battery assembly is activated; in the event at least one battery pack from the battery assembly is activated, selecting a current battery pack from the battery assembly having a current voltage measurement, wherein the current voltage measurement is closest to a previous voltage measurement, and wherein the previous voltage measurement is a voltage measurement of a previously selected battery pack, wherein the previously selected battery pack is activated; determining a difference between the current voltage measurement and a previous voltage measurement; in the event the difference is less than a pre-determined threshold, activating the current battery pack; and designating the current battery pack as a previously selected battery pack.

Example 21 includes the method of Example 20, further comprising: determining an average of voltage measurements of all battery packs in the battery assembly; selecting a first battery pack having a voltage measurement closest to the average voltage measurement; activating the first battery pack; and designating the first battery pack as a previously selected battery pack.

Example 22 includes the method of any of Examples 20-21, wherein the pre-determined threshold is a calibratable threshold.

Example 23 includes the method of any of Examples 20-22, wherein the pre-determined threshold is between 10V and 12V.

Example 24 includes a battery assembly for an electric vehicle, the battery assembly comprising: a plurality of battery packs, wherein each battery pack is electrically coupled in parallel with one another.

Example 25 includes the battery pack assembly of Example 24, further comprising: a plurality of sub-assemblies, each sub-assembly comprising at least two battery packs, wherein each of the plurality of sub-assemblies are electrically coupled to one another in parallel.

Example 26 includes the battery pack assembly of any of Examples 24-25, wherein the electric vehicle is a heavy-duty commercial electric vehicle.

Example 27 includes the battery pack assembly of any of Examples 24-26, wherein each of the plurality of battery packs comprise a plurality of battery modules.

Example 28 includes the battery pack assembly of any of Examples 24-27, wherein each of the plurality of battery packs comprise at least eight battery modules electrically coupled in series with one another.

Example 29 includes a method of balancing voltage levels in a battery assembly comprising a plurality of battery packs, the method comprising: comparing voltage levels of a first pair of battery packs in the battery assembly, the first pair of battery packs comprising a first battery pack and a second battery pack; and in the event the voltage level of a first battery pack differs from the voltage level of the second battery pack by at least a threshold amount, activating the first battery pack and the second battery pack to cause the current to flow therebetween and equalize the voltage level of the first battery pack and the second battery pack.

Example 30 includes the method of Example 29, further comprising: in the event the voltage level of the first battery pack differs from the voltage level of the second battery pack by less than the threshold amount, comparing voltage levels of a second pair of battery packs in the battery assembly.

Example 31 includes the method of Example 30, wherein the second pair of battery packs comprises (i) either the first battery pack or the second battery pack, and (ii) a third battery pack.

Example 32 includes the method of any of Examples 30-31, wherein the second pair of battery packs comprises a third battery pack and a fourth battery pack.

Example 33 includes a method of managing operation of battery assembly of a vehicle, the method comprising: receiving a signal indicating a discrepancy in a battery pack of the battery assembly; and isolating the battery pack from one or more remaining components of the battery assembly.

Example 34 includes the method of Example 33, wherein isolating the battery pack from remaining components of the battery assembly further comprises at least one of: disabling electrical coupling between a first battery module and a second battery module in the battery pack; disabling electrical coupling between the battery pack and remaining components of the battery assembly and transitioning the battery pack to an inoperable state.

Example 35 includes the method of Example 34, wherein disabling electrical coupling between a first battery module and a second battery module further comprises communicating a signal to activate a pyrofuse and break circuit path between the first battery module and the second battery module.

Example 36 includes the method of any of Examples 33-35, wherein receiving a signal indicating a discrepancy in a battery pack of the battery assembly further comprises at least one of: receiving a signal that the battery pack is impacted by an emergency situation; and receiving a signal that the battery pack is functioning abnormally in comparison to at least one other battery pack of the battery assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A battery pack comprising:
   a first module assembly comprising a first plurality of battery modules;
   a second module assembly comprising a second plurality of battery modules, wherein the first module assembly is electrically coupled to the second module assembly;
   a first electrical connector coupled to the first module assembly;
   a second electrical connector coupled in parallel to the first electrical connector;
   a third electrical connector coupled to the second module assembly;
   a fourth electrical connector coupled in parallel to the third electrical connector; and
   a circuit breaking system electrically coupled to at least one of the first module assembly or the second module assembly such that, responsive to an emergency signal, the circuit breaking system disables electrical coupling between at least one of: the first module assembly and the second module assembly, the first module assembly and the first electrical connector, or the second module assembly and the third electrical connector.

2. The battery pack of claim 1, wherein the first plurality of battery modules comprises four battery modules.

3. The battery pack of claim 1, wherein the circuit breaking system is electrically coupled to the first module assembly and the second module assembly such that the first module assembly and the second module assembly are electrically coupled via the circuit breaking system, and
   wherein, responsive to an emergency signal, the circuit breaking system disables electrical coupling between the first module assembly and the second module assembly.

4. The battery pack of claim 3, wherein the circuit breaking system comprises a fuse electrically coupled to the first module assembly and the second module assembly, and
   wherein, responsive to the emergency signal, the fuse is activated to disable the electrical coupling between the first module assembly and the second module assembly.

5. The battery pack of claim 4, wherein the fuse is a pyro fuse, and wherein, responsive to the emergency signal, a bus in the pyro fuse is broken to disable the electrical coupling between the first module assembly and the second module assembly.

6. The battery pack of claim 4, wherein the fuse is electrically coupled to the first module assembly in series at a first connector, and
wherein the fuse is electrically coupled to the second module assembly in series at a second connector.

7. The battery pack of claim 3, wherein the circuit breaking system comprises:
a manual service disconnect (MSD) switch, wherein the MSD switch, in a closed position, electrically couples the first module assembly in series with the second module assembly; and
a miniature circuit breaker (MCB) coupled to the MSD switch, such that responsive to the emergency signal, the MCB transmits a signal to the MSD switch such that the MSD switch flips to an open position to disable the electrical coupling between the first module assembly and the second module assembly.

8. The battery pack of claim 1, wherein the battery pack operates at a voltage between 520 volts and 800 volts.

9. The battery pack of claim 1, wherein the second plurality of battery modules comprises four battery modules.

10. The battery pack of claim 1, wherein the circuit breaking system comprises at least one of:
a first electrical switch coupled to the first module assembly and further coupled to the first electrical connector, wherein when the first electrical switch is in a closed position, the first connector is coupled to the first module assembly via the first electrical switch; or
a second electrical switch coupled to the second module assembly and further coupled to the third electrical connector, wherein when the second electrical switch is in a closed position, the third electrical connector is coupled to the second module assembly via the second electrical switch, and
wherein, responsive to the emergency signal, at least one of the first electrical switch or the second electrical switch flips to an open position to disable the electrical coupling between the battery pack and one or more components of a battery assembly comprising the battery pack.

11. The battery pack of claim 1, further comprising at least one transceiver coupled to the MCB, wherein the transceiver receives the emergency signal.

12. The battery pack of claim 1, further comprising at least one current shunt electrically coupled to at least one battery module of the second battery assembly and further coupled to the MCB, wherein the at least one current shunt is configured to monitor outgoing current from the battery pack.

13. The battery pack of claim 1, wherein the battery pack is coupled to at least one pack battery management system (BMS), wherein the pack BMS is configured to communicate with one or more other BMS comprised in a battery assembly comprising the battery pack, and wherein the pack BMS is further configured to monitor and maintain operation voltage of the battery pack.

14. The battery pack of claim 1, wherein the first module assembly comprises the same number of battery modules as the second module assembly.

15. A method of isolating a battery pack from one or more components of a battery assembly, the method comprising:

receiving, via a battery management system (BMS), a signal indicating that an emergency situation has been detected,
wherein the battery assembly comprises the battery pack,
wherein the battery pack comprises a first module assembly and a second module assembly,
wherein the first module assembly comprises a plurality of battery modules, and
wherein the second module assembly comprises a plurality of battery modules;
opening, responsive to the signal, a circuit between a first module assembly and a second module assembly to stop current flow between the first module assembly and the second module assembly:
transmitting a signal from a miniature circuit breaker (MCB) to a manual service disconnect (MSD) switch, the signal configured to cause the MSD switch to flip to an open position and disable electrical coupling between the first module assembly and the second module assembly; and
flipping the MSD switch to the open position.

16. The method of claim 15, wherein, when the transmitting the signal from the MCB does not result in disabling electrical coupling between the first module assembly and the second module assembly, opening the circuit between the first module assembly and the second module assembly further comprises:
transmitting a signal to a pyro fuse to disable electrical coupling between the first module assembly and the second module assembly, wherein the pyro fuse is electrically coupled between the first module assembly and the second module assembly; and
breaking a bus within the pyro fuse.

17. The method of claim 15, wherein opening the circuit between the first module assembly and the second module assembly further comprises:
transmitting a signal to a fuse to disable electrical coupling between the first module assembly and the second module assembly, wherein the fuse is electrically coupled between the first module assembly and the second module assembly; and
breaking a bus within the fuse.

18. The method of claim 17, wherein transmitting the signal to the fuse further comprises transmitting the signal to a pyro fuse.

19. A battery pack comprising:
a first module assembly comprising a first battery module, a second battery module, a third battery module, and a fourth battery module, wherein the first battery module is electrically coupled in series to the second battery module, wherein the second battery module is electrically coupled in series to the third battery module, and wherein the third battery module is electrically coupled in series to the fourth battery module;
a second module assembly comprising a fifth battery module, a sixth battery module, a seventh battery module, and an eighth battery module, wherein the fifth battery module is electrically coupled in series to the sixth battery module, wherein the sixth battery module is electrically coupled in series to the seventh battery module, and wherein the seventh battery module is electrically coupled in series to the eighth battery module;
a manual service disconnect (MSD) switch having a first MSD connector and a second MSD connector, wherein the MSD switch is electrically coupled to the fourth battery module at the first MSD connector;

a pyro fuse comprising a first fuse connector and second fuse connector, wherein the pyro fuse, at the first fuse connector, is electrically coupled to the MSD switch at the second MSD connector, and wherein the pyro fuse is coupled to the sixth battery module at the second fuse connector;

a first positive electrical connector coupled to the first battery module;

a second positive electrical connector coupled to the first positive electrical connector;

a first negative electrical connector coupled to the eighth battery module; and a second negative electrical connector coupled to the first negative electrical connector.

\* \* \* \* \*